US012418731B2

(12) United States Patent
Vaziri et al.

(10) Patent No.: US 12,418,731 B2
(45) Date of Patent: Sep. 16, 2025

(54) VOLUMETRIC IMAGING TECHNIQUES

(71) Applicant: The Rockefeller University, New York, NY (US)

(72) Inventors: Alipasha Vaziri, New York, NY (US); Tobias Noebauer, New York, NY (US); Yuanlong Zhang, Qingyang (CN)

(73) Assignee: The Rockefeller University, New York, NY (US)

( * ) Notice: Subject to any disclaimer, the term of this patent is extended or adjusted under 35 U.S.C. 154(b) by 91 days.

(21) Appl. No.: 18/556,268

(22) PCT Filed: Apr. 20, 2022

(86) PCT No.: PCT/US2022/025545
§ 371 (c)(1),
(2) Date: Oct. 19, 2023

(87) PCT Pub. No.: WO2022/226067
PCT Pub. Date: Oct. 27, 2022

(65) Prior Publication Data
US 2024/0187748 A1 Jun. 6, 2024

Related U.S. Application Data

(60) Provisional application No. 63/177,077, filed on Apr. 20, 2021.

(51) Int. Cl.
*H04N 23/957* (2023.01)
*G06T 5/73* (2024.01)
(Continued)

(52) U.S. Cl.
CPC ............ *H04N 23/957* (2023.01); *G06T 5/73* (2024.01); *G06T 7/12* (2017.01); *G06T 7/155* (2017.01);
(Continued)

(58) Field of Classification Search
CPC ...... H04N 23/957; H04N 23/81; H04N 23/55; G06T 7/12; G06T 7/194; G06T 7/262;
(Continued)

(56) References Cited

U.S. PATENT DOCUMENTS

2012/0019626 A1* 1/2012 Hou .................... G01N 21/9501
348/136
2014/0263963 A1 9/2014 Broxton et al.
(Continued)

OTHER PUBLICATIONS

International Search Report and Written Opinion issued Aug. 4, 2022 in PCT/US2022/025545 (15 pages).
(Continued)

*Primary Examiner* — Allen C Wong
(74) *Attorney, Agent, or Firm* — NovoTechIP International PLLC

(57) ABSTRACT

A volumetric imaging system implements obtaining raw image data of a sample volume of a sample material, the raw image data comprising light field data of the sample volume acquired using a microlens array disposed in front of a camera; and analyzing the raw image data using an image analysis pipeline configured to localize the objects of interest in the raw image data to obtain classified image data in which the objects of interest have been identified, the image analysis pipeline being configured to process the raw image data to improve signal extraction at depth in the scattering material to maximize localization accuracy.

20 Claims, 31 Drawing Sheets

(51) Int. Cl.
  *G06T 7/12* (2017.01)
  *G06T 7/155* (2017.01)
  *G06T 7/194* (2017.01)
  *G06T 7/262* (2017.01)
  *G06T 7/70* (2017.01)
  *G06V 10/26* (2022.01)
  *G06V 10/82* (2022.01)
  *G06V 20/69* (2022.01)
  *H04N 23/55* (2023.01)
  *H04N 23/81* (2023.01)
  *G02B 21/36* (2006.01)

(52) U.S. Cl.
  CPC .............. *G06T 7/194* (2017.01); *G06T 7/262* (2017.01); *G06T 7/70* (2017.01); *G06V 10/273* (2022.01); *G06V 10/82* (2022.01); *G06V 20/695* (2022.01); *G06V 20/698* (2022.01); *H04N 23/55* (2023.01); *H04N 23/81* (2023.01); *G02B 21/365* (2013.01); *G06T 2207/10056* (2013.01); *G06T 2207/20021* (2013.01); *G06T 2207/20036* (2013.01); *G06T 2207/20056* (2013.01); *G06T 2207/20084* (2013.01); *G06T 2207/30016* (2013.01); *G06T 2207/30101* (2013.01)

(58) Field of Classification Search
  CPC .. G06T 7/155; G06T 7/70; G06T 5/73; G06T 2207/10056; G06T 2207/20021; G06T 2207/20036; G06T 2207/20056; G06T 2207/20084; G06T 2207/30016; G06T 2207/30101; G06V 20/695; G06V 20/698; G06V 10/82; G06V 10/273; G02B 21/365
  USPC .......................................................... 348/79
  See application file for complete search history.

(56) References Cited

U.S. PATENT DOCUMENTS

| | | | |
|---|---|---|---|
| 2016/0202460 A1* | 7/2016 | Zheng | G02B 21/16 348/79 |
| 2017/0205615 A1 | 7/2017 | Vaziri et al. | |
| 2020/0201018 A1 | 6/2020 | Vaziri et al. | |
| 2020/0241274 A1* | 7/2020 | Dai | H04N 23/69 |
| 2022/0293243 A1* | 9/2022 | Callcut | A61B 8/085 |

OTHER PUBLICATIONS

Andalman Aarons, et al., "Neuronal Dynamics Regulating Brain and Behavioral State Transitions", Cell, vol. 177, No. 4, May 2, 2019 (May 2, 2019) (37 pages).

Tobias Nobauer, et al., "Mesoscale volumetric light field (MesoLF) imaging of neuroactivity across cortical areas at 18 Hz," Nat Methods. Apr. 2023 ; 20(4): 600-609. doi:10.1038/s41592-023-01789-z. (33 pages) (official publication of the NPL 3 Manuscript).

* cited by examiner

| Surf | Type | Radius | Thickness | Glass | Diameter | Conic | Comment |
|---|---|---|---|---|---|---|---|
| OBJ | STANDARD | Infinity | 73.2824 | | 39.48624 | 0 | Working distance to image |
| 1 | STANDARD | Infinity | 5.681997 | S-NPH3 | 46.24271 | 0 | Tube lens element 1-1 |
| 2 | STANDARD | 47.54008 | 15 | S-LAH58 | 46.79464 | 0 | Tube lens element 1-2 |
| 3 | STANDARD | -65.98939 | 1 | | 47.24878 | 0 | |
| 4 | STANDARD | -141.853 | 8 | S-NPH2 | 45.35933 | 0 | Tube lens element 2-1 |
| 5 | STANDARD | 43.00492 | 8.325021 | N-PSK53A | 43.72207 | 0 | Tube lens element 2-2 |
| 6 | STANDARD | Infinity | 76.73808 | | 43.97391 | 0 | |
| 7 | STANDARD | Infinity | 11.37424 | S-NPH2 | 57.60257 | 0 | Tube lens element 3-1 |
| 8 | STANDARD | -53.3137 | 5 | S-LAH589 | 57.86669 | 0 | Tube lens element 3-2 |
| 9 | STANDARD | -211.269 | 4.28 | | 58.03535 | 0 | |
| 10 | STANDARD | Infinity | 206 | | 56.75176 | 0 | Housing edge |
| STO | STANDARD | Infinity | | | 15.89254 | 0 | Stop (5 mm from objective) |

FIG. 1D

FIG. 2B
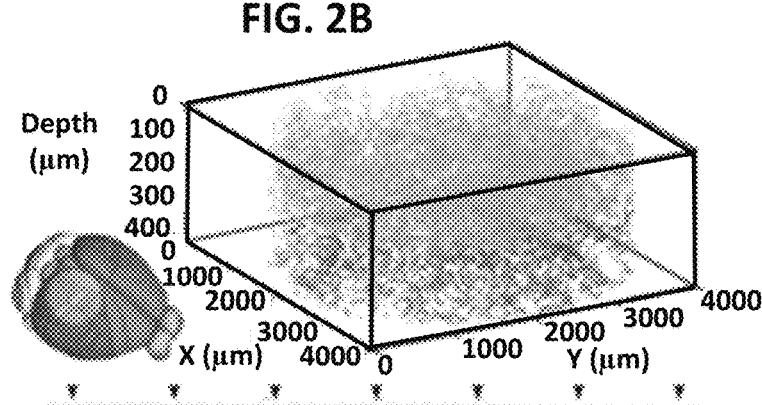
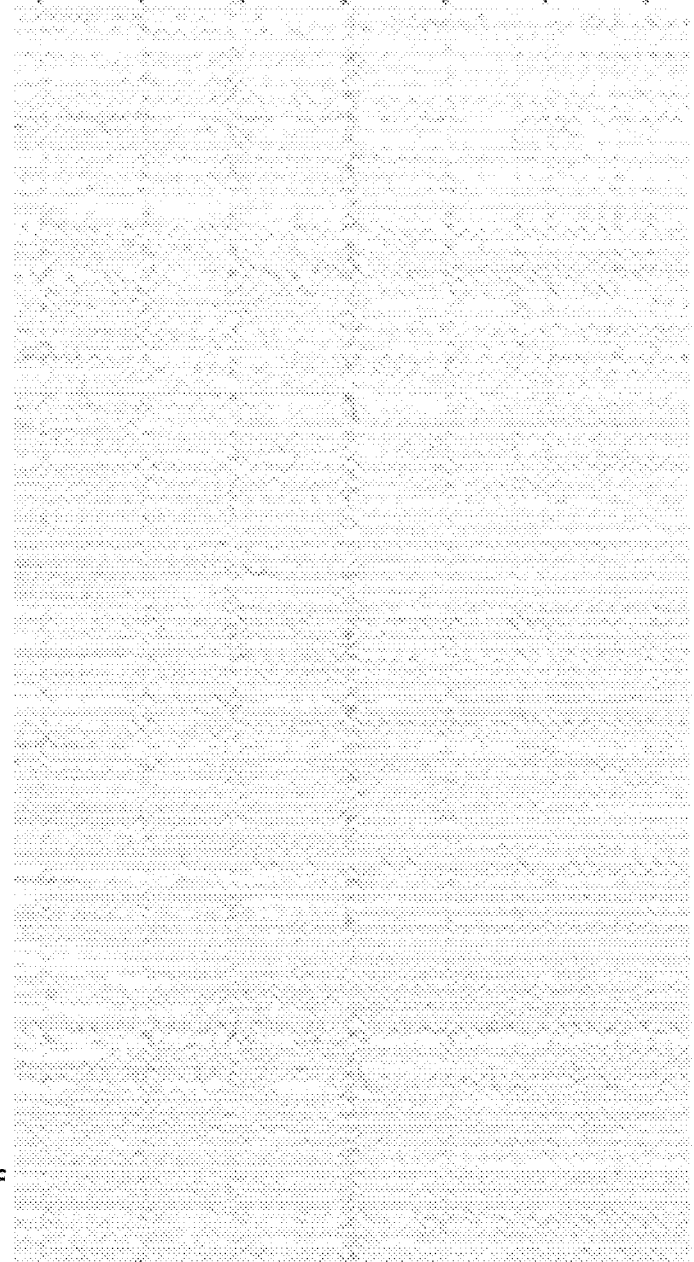
Trace offset dF
SNR=0
FIG. 2D
Time (s)

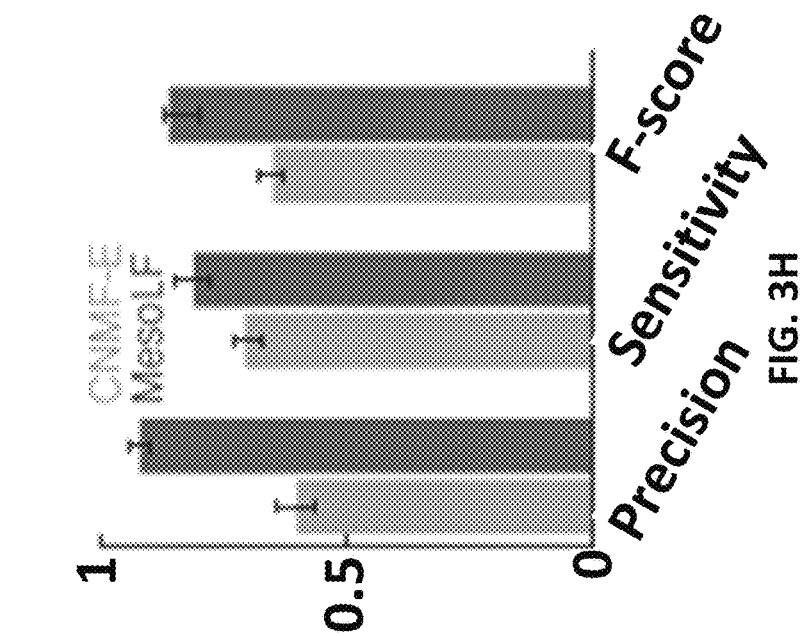
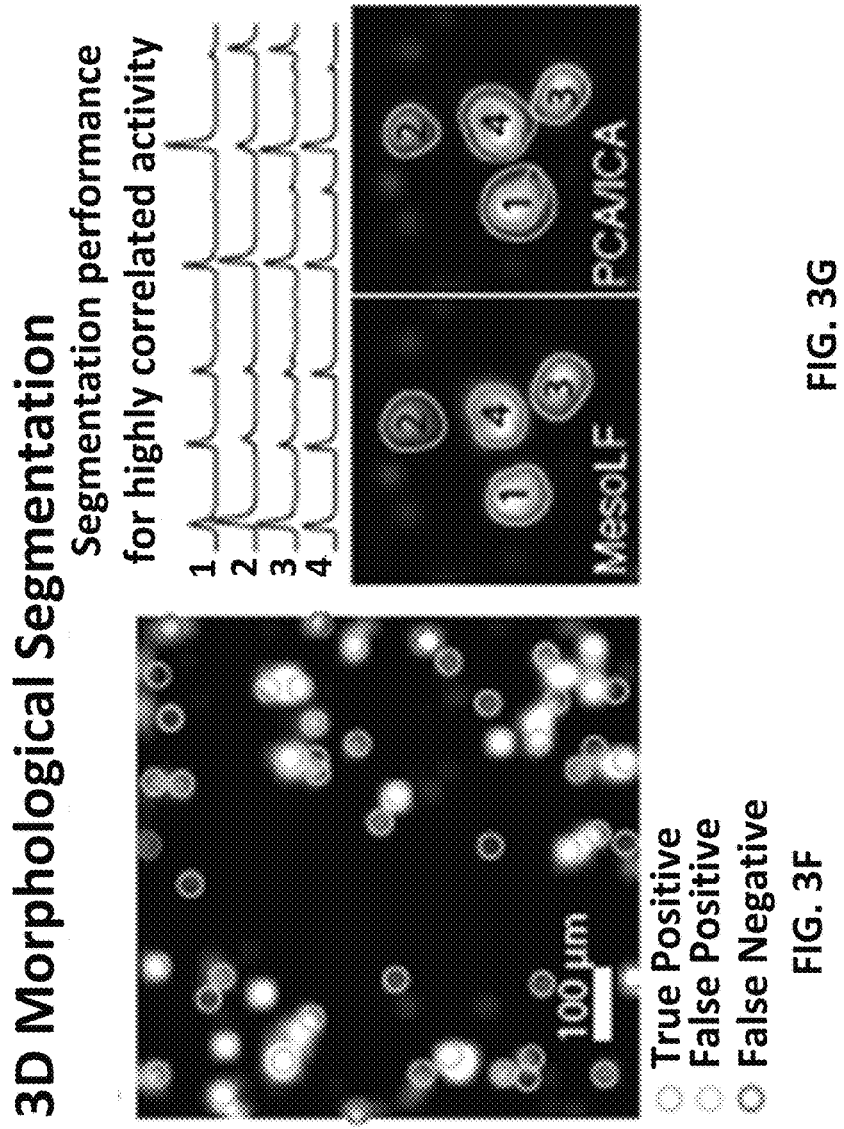
FIG. 3F
FIG. 3G
FIG. 3H

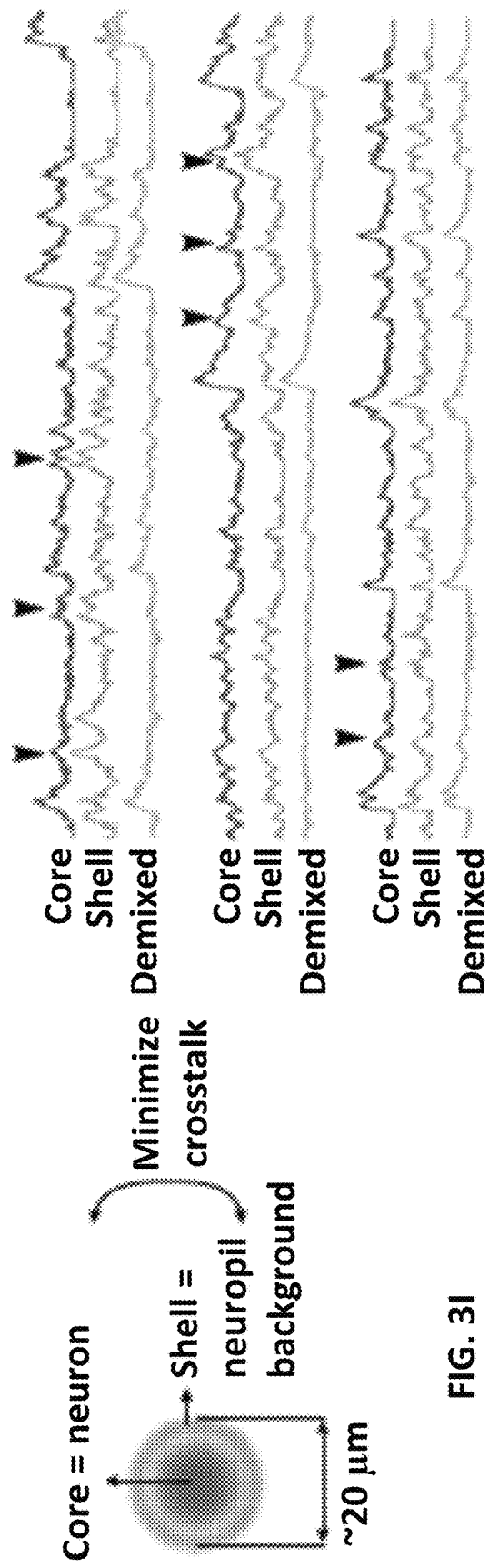

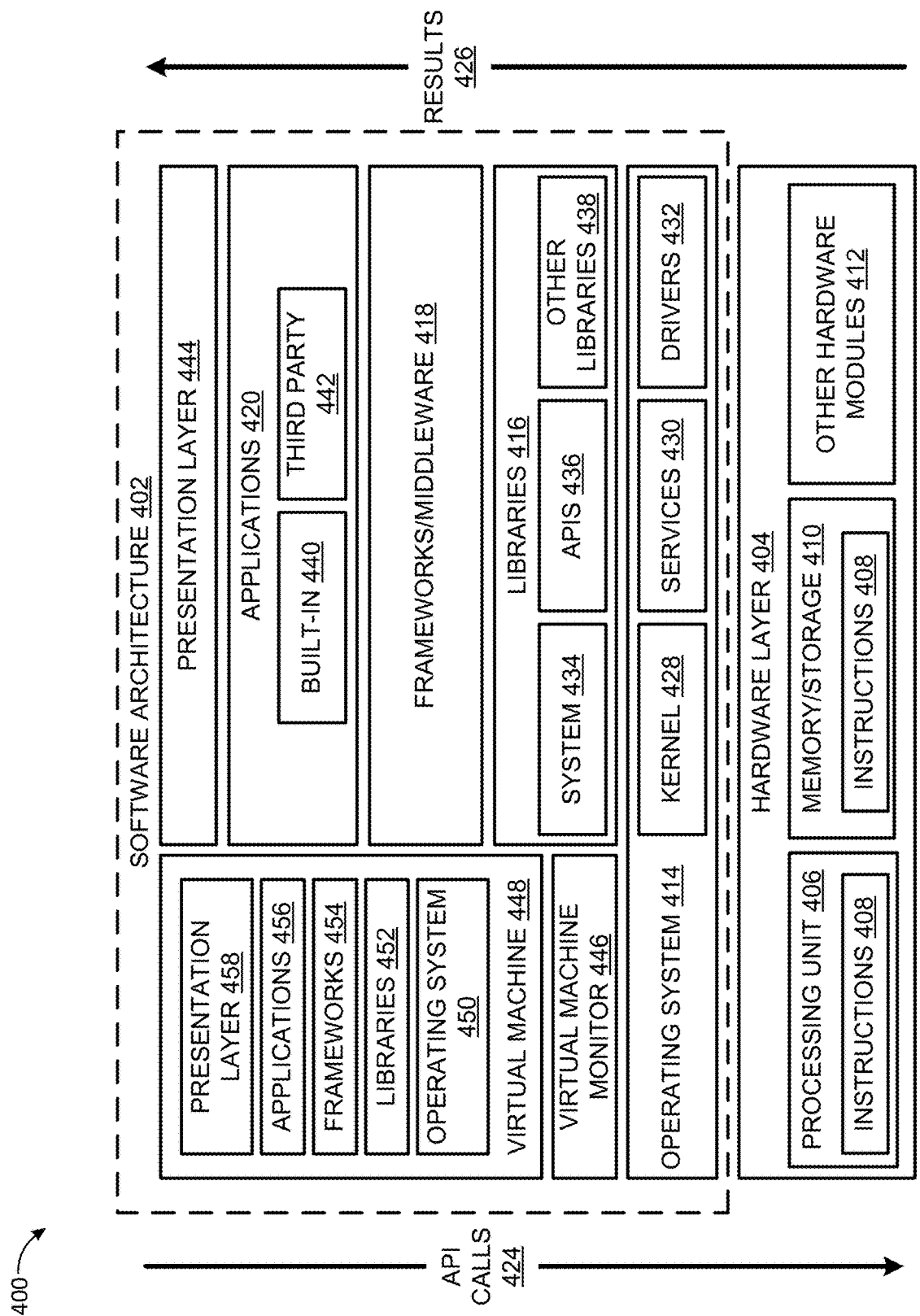

Algorithm 1. MesoLF artifact-free phase space reconstruction

Initialize $X^{(0)} = X_{init}$, $t = 0$.
Rearrange captured image $Y$ into phase space image $Y_{v_1,v_2}$.
Calculate the anti-aliasing filter radius $\omega(z)$ for the different $z$ depths.
while $t < T$ do:
  $t = t + 1$
  for $(v_1, v_2)$ in phase space, do:
  $$X^{(t)} = X^{(t-1)} + \hat{X}^{(t-1)} + \alpha_{t-1} \hat{X}^{(t-1)} \odot \mathbf{H}_{BACK}^{v_1,v_2}\left(\frac{Y}{\mathbf{H}_{FOR}^{v_1,v_2}(X^{(t-1)})}\right)$$
  for $z$ in all depths, do:
  $$X_z^{(t)} = X_z^{(t)} * e^{-\frac{(x^2+y^2)}{2(\frac{\omega(z)}{2\sqrt{2\log 2}})^2}}$$
  end
  end
End
return $X^{(t)}$

FIG. 7

Algorithm 2. MesoLF reconstruction with background peeling

Captured LFM image $Y$. Initialize $X^{(0)} = X_{init}$. Hyperparameters $\beta_1, \beta_2$. Prepare the extended PSF $H'$.

▲ Run reconstruction (using phase space or pixel space Richardson-Lucy method) using $H'$ and $Y$, which results in volume estimate $X'$ ▲ Take the top layer of $X'$ as $X_1^t$, project it to the sensor plane through $p_1 =$ $H_{for}(X_1^t \cdot (X_1^t > \beta_1))$.

▲ Update captured image $Y' = Y - \beta_2 p_1$.

▲ Take the bottom layer of $X'$ as $X_b^t$, project it to the sensor plane through $p_{T+S+B} =$ $H_{for}(X_b^t \cdot (X_b^t > \beta_1))$.

▲ Update captured image $Y'' = Y' - \beta_2 p_{T+S+B}$.

▲ Run reconstruction (with phase space or RL method) using $H'$ and $Y''$, and output $X''$, and $T+S+1,...,T+S+$ ▲ Crop the $X'$ along the z-axis by discarding slices $1,...,T$ and $T+S+1,...,T+S+$ $B$. The result is $X_{out}$ Return $X_{out}$

FIG. 8

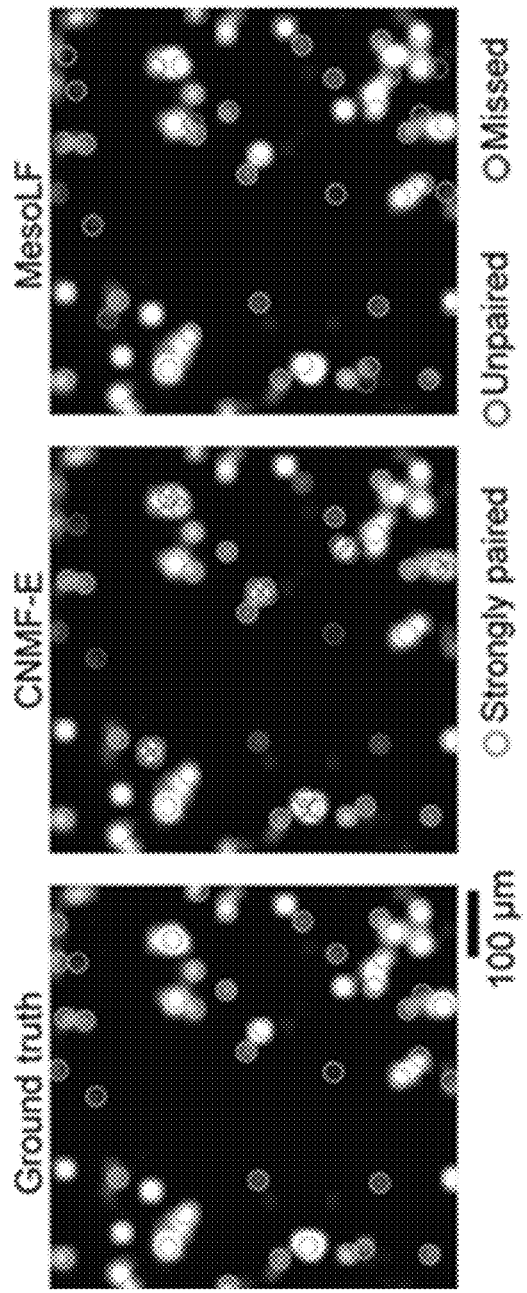
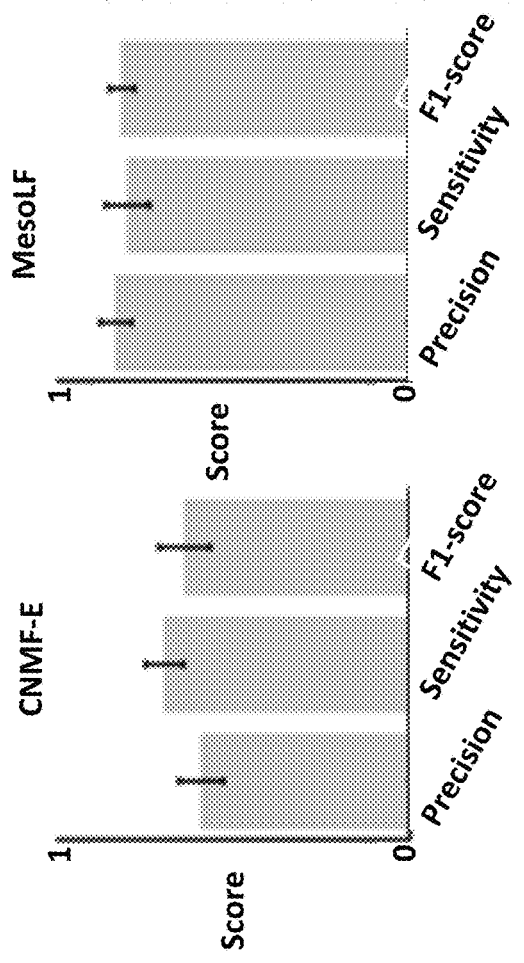
FIG. 9A
FIG. 9B

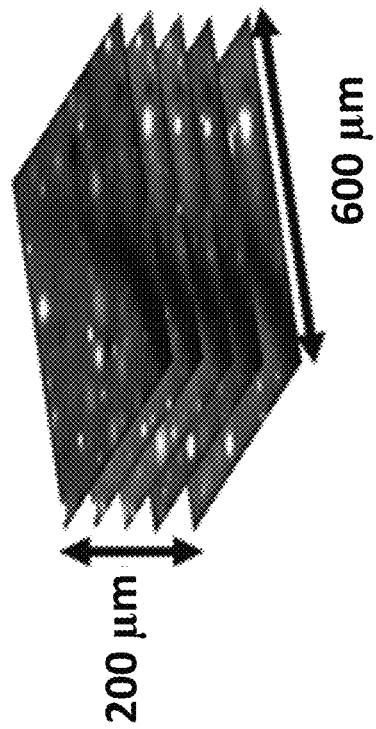
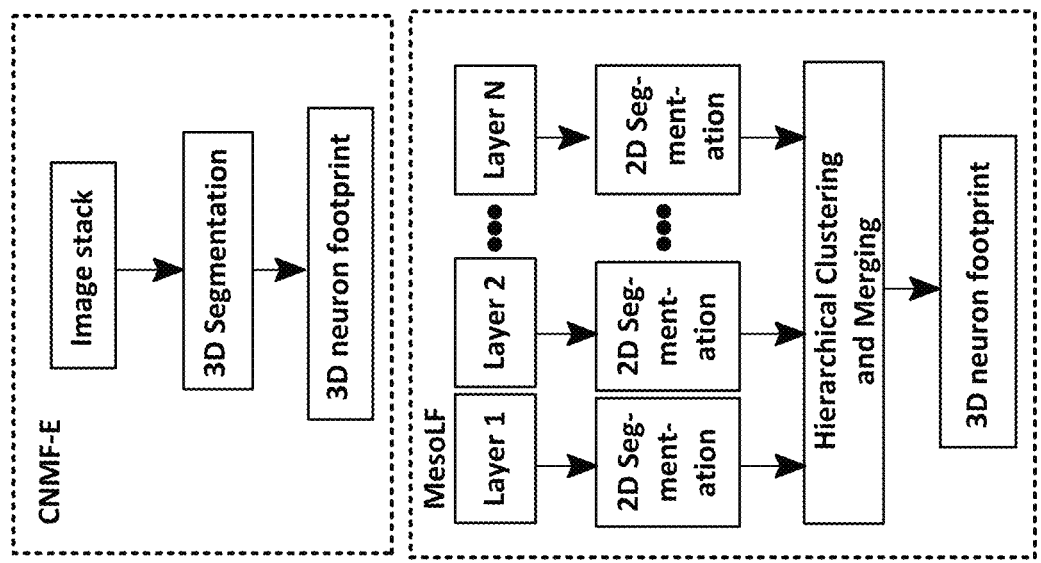
FIG. 9C

VOLUMETRIC IMAGING TECHNIQUES

CROSS-REFERENCE TO RELATED APPLICATIONS

This application is a U.S. National Stage of PCT application Ser. No. PCT/US2022/025545, filed on Apr. 20, 2022, which claims priority from U.S. provisional application Ser. No. 63/177,077, filed on Apr. 20, 2021, the specifications of which are incorporated herein by reference.

BACKGROUND

Various implementations of mesoscopes provide optical access for calcium imaging across multi-millimeter fields-of-view (FOV) in the mammalian brain. However, capturing the activity of the neuronal population within such FOVs nearly-simultaneously and in a volumetric fashion has remained challenging since approaches for imaging scattering brain tissues typically are based on sequential acquisition. Hence, there is a need for improved systems and methods of volumetric imaging that provide a larger FOV nearly-simultaneously and in volumetric fashion.

SUMMARY

An example data processing system, according to the disclosure, includes a processor and a computer-readable medium storing executable instructions. The instructions, when executed cause the processor to perform operations including: obtaining raw image data of a sample volume of a sample material, the raw image data comprising light field data of the sample volume acquired using a mesoscope or microscope having a microlens array disposed in front of a camera, the sample material comprising scattering or non-scattering tissue exhibiting time varying changes of light signals from objects of interest; and analyzing the raw image data using an image analysis pipeline configured to localize the objects of interest in the raw image data to obtain classified image data in which the objects of interest have been identified, the image analysis pipeline being configured to process the raw image data to improve signal extraction at depth in the scattering material to maximize localization accuracy.

An example method according to the disclosure is implemented in a data processing system for volumetric imaging includes obtaining raw image data of a sample volume of a sample material, the raw image data comprising light field data of the sample volume acquired using a mesoscope or microscope having a microlens array disposed in front of a camera, the sample material comprising scattering or non-scattering tissue exhibiting time varying changes of light signals from objects of interest; and analyzing the raw image data using an image analysis pipeline configured to localize the objects of interest in the raw image data to obtain classified image data in which the objects of interest have been identified, the image analysis pipeline being configured to process the raw image data to improve signal extraction at depth in the scattering material to maximize localization accuracy.

An example machine-readable medium according to the disclosure stores instructions. The instructions when executed cause a processor of a programmable device to perform operations of obtaining raw image data of a sample volume of a sample material, the raw image data comprising light field data of the sample volume acquired using a mesoscope or microscope having a microlens array disposed in front of a camera, the sample material comprising scattering or non-scattering tissue exhibiting time varying changes of light signals from objects of interest; and analyzing the raw image data using an image analysis pipeline configured to localize the objects of interest in the raw image data to obtain classified image data in which the objects of interest have been identified, the image analysis pipeline being configured to process the raw image data to improve signal extraction at depth in the scattering material to maximize localization accuracy.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 1D shows a table that provides a surface listing for the optical path shown in FIGS. 1A-1C.

FIGS. 2B, 2C, and 2D show an example ~7-minute recording at 18 Hz of a mouse expressing a modified version of the cell-body-targeted calcium indicator SomaGCaMP7f, a total of 23,402 active neurons being detected across three volumetric FOVs of ø4000×200 µm$^3$, of which 10,582 were located in the depth range of 0-200 µm, 8,076 in the depth range of 100-300 µm, and 4,746 in the range of 200-400 µm.

FIGS. 3F, 3G, and 3H are diagrams showing examples of 3D morphological segmentation by the MesoLF computational pipeline.

FIGS. 3I, 3J, and 3K are diagrams showing examples of local background demixing by the MesoLF computational pipeline.

FIGS. 3O, 3P, and 3Q are diagrams showing examples of motion correction by the MesoLF computational pipeline.

FIG. 4 is a block diagram illustrating an example software architecture, various portions of which may be used in conjunction with various hardware architectures herein described, which may implement any of the features herein described.

FIG. 7 is a diagram of pseudocode for an example algorithm for MesoLF artifact-free phase space reconstruction.

FIG. 8 is a diagram of pseudocode for an example algorithm for MesoLF reconstruction with background peeling.

FIG. 9A is a diagram providing a comparison of segmentation performance of MesoLF and CNMF-E in a 2D slice from a MesoLF recording in a mouse cortex.

FIG. 9B provides a comparison of precision, sensitivity, and F1-scores for neuron detection in CNMF-E and MesoLF.

FIG. 9C includes an illustrate of a 3D volume containing neurons and exhibiting scattering (left side), a schematic illustration of the segmentation pipeline in CNMF-E (top right) and of the segmentation pipeline in MesoLF (bottom right).

DETAILED DESCRIPTION

Figure 1A:
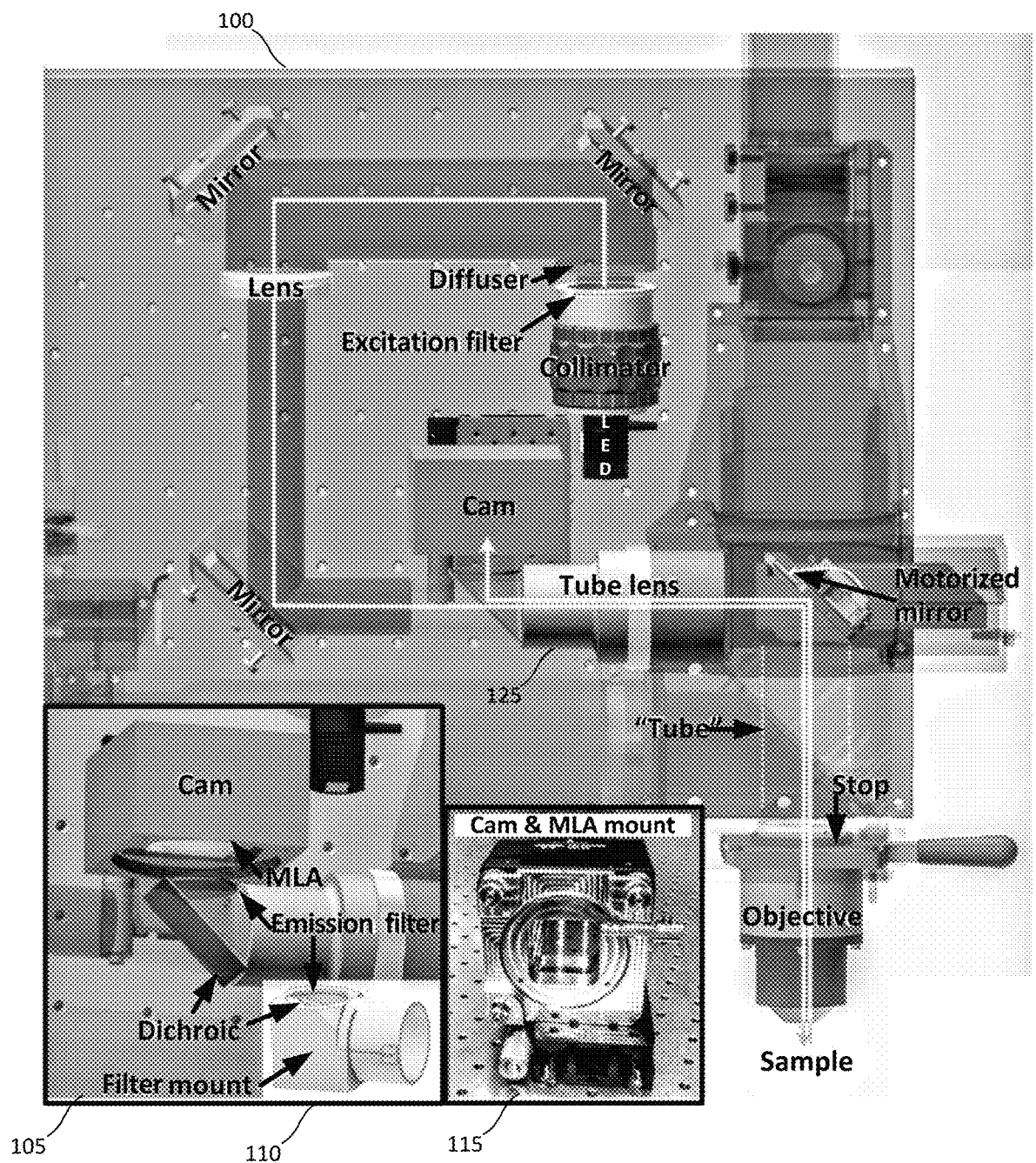
FIG. 1A is an image that shows a rendering of components forming the mesoscale light field (MesoLF) optical path.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for mesoscale light field (MesoLF) imaging are described herein. These techniques may be used for sampling scattering or non-scattering samples of various types that exhibit fluorescence and temporal dynamics. Sample may include but are no limited to cell cultures. For example, these techniques may be used for imaging in a scattering medium to extract and demix spatiotemporal components in the medium being imaged. These techniques may, for example, be used for calcium imaging in the mammalian brains to record from thousands of neurons within volumes of ø4000×200 µm, located at up to 400 µm depth in the cortex, at 18 volumes per second. The MesoLF imaging may be implemented by modular hardware and software components described herein which may enable hour-long recording of ~10,000 neurons across multiple cortical areas in mice using workstation-grade computing resources. While the examples which follow are related to imaging of neuronal activity in the mammalian brain, the volumetric imaging techniques described herein are not limited to scanning brain tissue and may be used to provide improved imaging results for other types of samples of scattering or non-scattering materials. These and other technical benefits of the techniques provided herein will be evident from the examples which follow.

Light Field Microscopy

Information flow across cortical areas is a hallmark of higher-level perception, cognition, and the neuronal network dynamics that underlie complex behaviors. Yet tracing this information flow in a volumetric fashion across mesoscopic fields-of-view (FOV), at a cellular resolution and at a temporal bandwidth sufficient to capture the dynamics of genetically encoded calcium indicators (GECIs), i.e., 10-20 Hz, has remained challenging. In the realm of multi-photon microscopy, several cellular-resolution mesoscopes have been presented that reach FOVs measuring up to ~5 mm in diameter but typically, fast calcium imaging in these designs is constrained to smaller regions-of-interests. More importantly, since the volumetric imaging rate achievable in serial scanning methods scales as the inverse third power of the side length of the imaged volume, scaling up sequential acquisition approaches to mesoscopic volumes has thus far remained limited and highly involved. Scan-free, mesoscopic widefield one-photon imaging approaches on the other hand, often based on low-NA or photographic objectives, have provided only coarse, low-resolution activity information, resolve only superficial neurons, or require sparse expression of GECIs and their targeting to superficial brain regions to achieve neuron-level discrimination.

In light field microscopy (LFM), a microlens array is used to encode volumetric information about the sample onto a 2D camera sensor. These sensor images are subsequently computationally reconstructed using the system's point-spread-function (PSF) to obtain 3D sample information. By doing away with the need for scanning excitation, these techniques offer the unique capability to scale up the acquisition volume both laterally and axially without sacrificing frame rate, and thus, in principle, can enable fast mesoscopic volumetric imaging. However, due to the limitations imposed by scattering tissues and the computational cost of large-scale deconvolutions, the use of LFM has been restricted to only sub-millimeter FOVs and weakly scattering specimen.

LFM has been recently extended into the scattering mammalian brain by exploiting the strongly forward-directed nature of light scattering in brain tissue and the capability of LFM to capture both angular and lateral position information contained in the incoming light field. The Seeded Iterative Demixing (SID) approach is designed to capture the remaining directional information present in the scattered light-field and, together with the spatiotemporal sparsity of neuronal activity, exploit this information to seed a machine learning algorithm that provides an initial estimate of the locations of the active neurons. SID then iteratively refines both the position estimates and the neuronal activity time series, thereby allowing for neuron localization and extraction of activity signals from depths up to ~400 µm in the mouse brain.

LFM's simplicity and scalability combined with SID's potential to extend this approach into scattering brain tissues in principle makes LFM highly attractive for mesoscale volumetric recording of neuroactivity. However, actual experimental realizations of mesoscopic LFM imaging in the mammalian cortex have thus far been hampered by a lack of solutions for capturing mesoscopic fields-of-views at high optical resolution across multi-millimeter FOVs and appropriate computational tools. On one hand the required computational resources for such tools need to efficiently scale with the imaged volume size—and hence the number of recorded neurons—and the number of the recorded frames. On the other hand, these computational tools must be able to address the unique challenges associated with faithful localization and extraction of neuronal signals at such scale.

High-resolution imaging across multi-millimeter FOVs requires careful correction of optical aberrations, in particular spherical aberration, which scales with the fourth power of the FOV radius and the sufficient correction of which often involves compromises in the correction of other optical aberrations. The computational reconstruction pipeline on the other hand, aside from being able to robustly extract remaining spatial and directional information from the ballistic and scattered photons, must be able to account for varying tissue morphology and a range of different conditions, such as blood vessels and their pulsation and other sources of non-rigid tissue deformation, while keeping computational cost at bay despite terabyte-scale raw data sizes.

MesoLF

The example implementations which follow demonstrate how MesoLF may overcome the challenges associated with LBM discussed in the preceding section. MesoLF provides a volumetric, one-photon-based approach that overcomes these challenges. MesoLF may be implemented using a modular hardware and software-based solution that combines mesoscale optical design and aberration correction with a scalable computational pipeline for neuronal localization and signal extraction. Volumetric recording from more than 10,500 active neurons across different regions of the mouse cortex within different volumes of ø4000×200 µm positioned at depths up to ~400 µm have been achieved. The activity of these neurons was captured at 18 volumes per second and over timespans exceeding one hour per session for which a single workstation equipped with three Graphics Processing Units (GPUs) was sufficient to perform signal extraction and demixing in a matter of hours.

The MesoLF optical systems have been designed to be compatible with a widely used commercial mesoscopy platform which is designed for multiphoton scanning microscopy but lacks well-corrected wide-field imaging capabilities. FIG. 1A is a diagram that shows an example of the MesoLF optical path 100. The optical path 100 may be implemented on a two-photon random access mesoscope (2p-RAM). Components of the 2 p-RAM system that are not relevant for the MesoLF optical path are shown semi-transparent in FIG. 1A. The inset image 105 provides a close-up view of the area around the dichroic mirror and the camera. The dichroic mirror holder is not shown in the inset image 105 and is instead shown in the sub-inset image 110 which shows the filter positions. Inset image 115 shows additional details associated with the microlens array included in the MesoLF optical path 100. Inset image 115 shows the camera with custom microlens array (MLA) kinematic rotation mount without the MLA installed. Additional details of the implementation of the optical path 100 are provided in the Optical Design and Data Acquisition Section which follows.

Figure 1B:
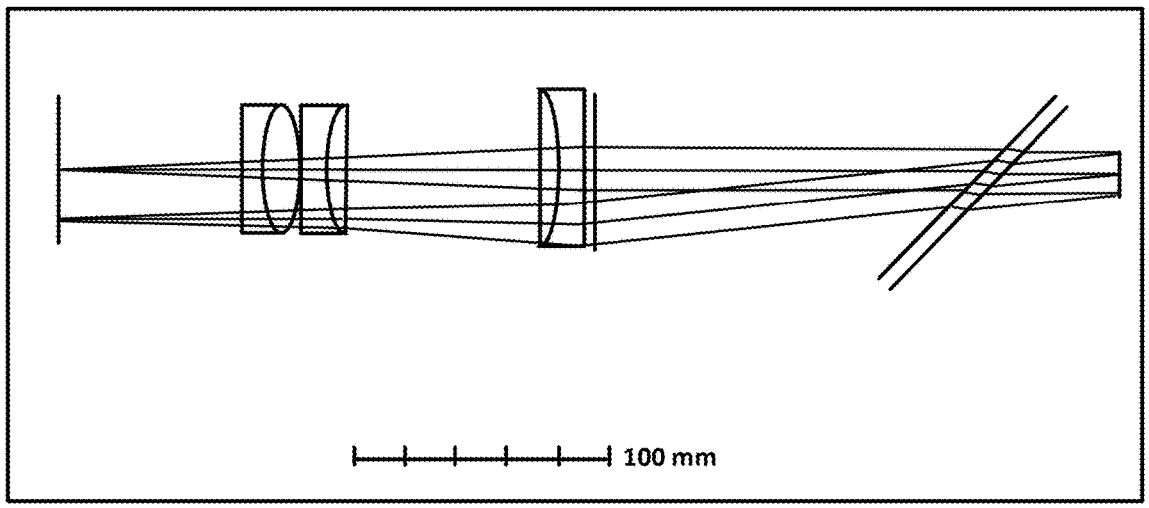
FIGS. 1B and 1C are diagrams that provide additional details of the light path shown in FIG. 1A.
Figure 1C:
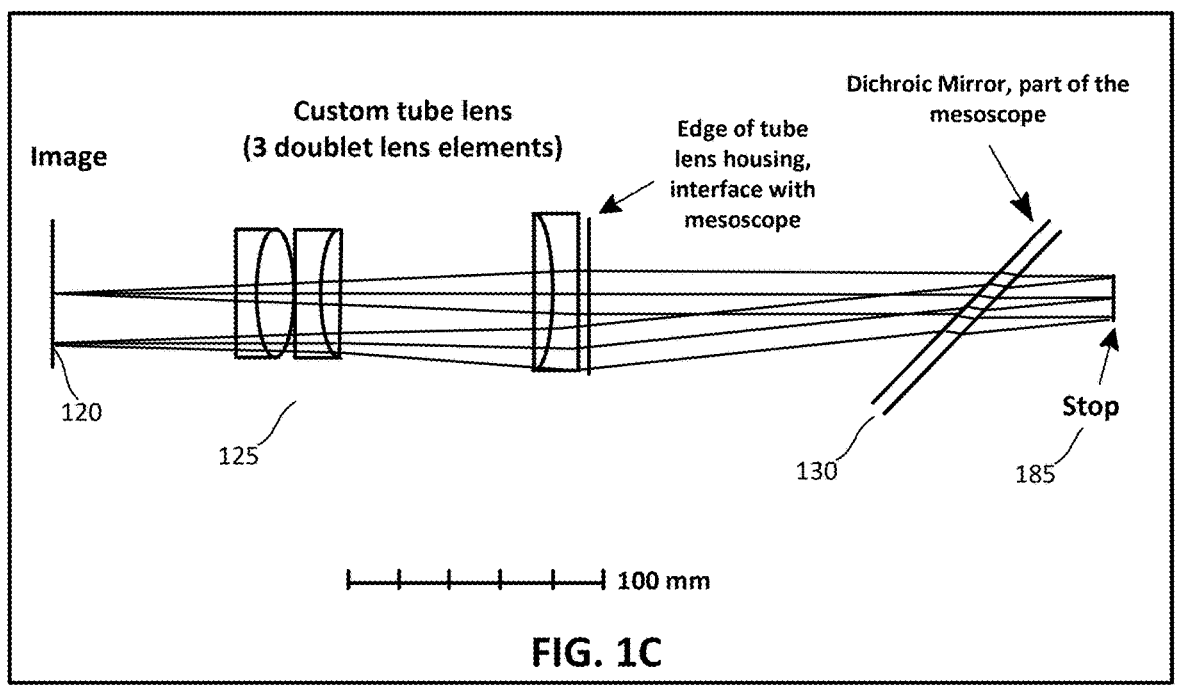

Additional details of an example implementation of the MesoLF optical path 100 are shown in FIGS. 1B-1D. The MesoLF optical path 100 is based on a custom tube lens 125 consisting of three doublet elements in a configuration akin to the Petzval objective design form. The elements were numerically optimized to correct the output of the mesoscope objective to achieve diffraction-limited imaging of a ø4-mm-FOV at NA 0.4 and 10× magnification in the 515-535 nm emission range of the GCaMP calcium indicators. The tube lens design offers a widefield (pre-LFM) optical resolution of ~600 line pairs per millimeter across the entire FOV, thus enabling a wide range of high-resolution mesoscopic applications other than LFM, which are often limited by insufficient resolution in large-FOV optics.

To facilitate LFM recording, a microlens array was placed into the image plane of our custom-designed tube lens. An 80-Megapixel CMOS camera captures the resulting LFM raw images at 18 frames per second. All optical components of the MesoLF system, including the 470 nm LED illumination arm, may form a module that may be integrated into the optical path of our mesoscope via a motorized fold mirror.

FIGS. 1B and 1C are diagrams that provide additional details of an example optical path 100 including the custom tube lens 125. FIG. 1B includes elements of the mesoscope, such as the dichroic mirror. FIG. 1B is unlabeled to better show the ray path through the optical path 100. FIG. 1C include labels that identify various components of the optical path 100. The dichroic mirror 130 is also part of the mesoscope shown in FIG. 1A. The image 120 is the image formed by the custom tube lens 125. The image 120 and the dichroic mirror 130 are shown to better illustrate the path of light rays through the optical path 100. Light enters the optical path 100 through the stop 185 and travels from the left to right to form the image 120. The custom tube lens 125 includes three doublet lens elements in the example implementation shown in FIGS. 1B and 1C. Example specifications for the doublet lenses shown in FIGS. 1B and 1C are shown in FIG. 1D.

FIG. 1D shows a table 140 that provides an example surface listing for the optical path 100. The table 140 includes a surface column 145, a surface type column 150, a radius column 155, a thickness column 160, a glass column 165, a diameter column 170, a conic column 175, and a comment column 180. The surface column 145 identifies the surface of components of the optical path 100. The surfaces reference in table 140 are in order from left to right on the diagrams of FIGS. 1B and 1C. The surfaces 1-9 referenced in the table 140 refer to the glass surfaces of the custom tube lens 125 that has been designed to facilitate the MesoLF techniques provided herein. The surface labeled "STOP" represents the stop at which light emerges from the back aperture of the objective that is part of the Mesoscope. The surface in table 140 labeled "IMA" represents the image formed by the custom tube lens 125 and is not part of the custom tube lens 125.

The surface type column 170 represents the type of surface of the lens. In the examples shown in table 140, the value is "STANDARD" for all rows, which indicates that the surfaces are spherical. The radius column 155 represents the radius of curvature of the surface represented in millimeters (mm). The thickness column 160 represents the thickness or distance to the next surface in millimeters. The glass column 165 represents an indicator of a type of glass used for that surface in the example implementation shown in FIGS. 1B and 1C. The diameter column 170 represents a maximum diametric diameter of light rays passing through the surface. The conic column 175 represents the conic constant associate with the surface. The zero value in the columns in the example shown in FIG. 1D indicate that the surfaces of the lenses in this example implementation are spherical. The comment column 180 includes comments associated with the surface.

Figure 2A:
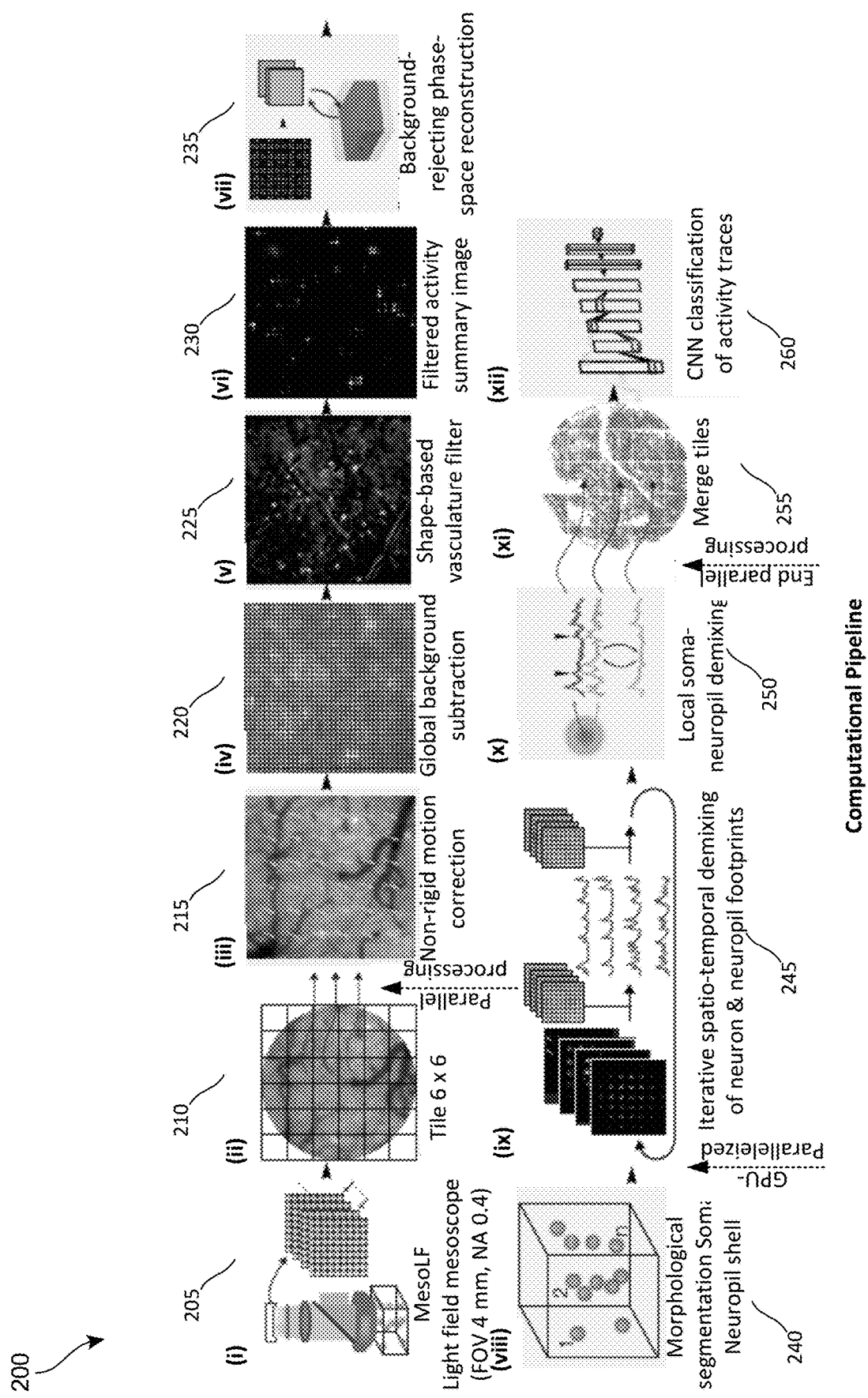
FIG. 2A shows an example computational pipeline that may be used to analyze image data captured by the MesoLF optical path shown in FIG. 1.
Figure 2C:
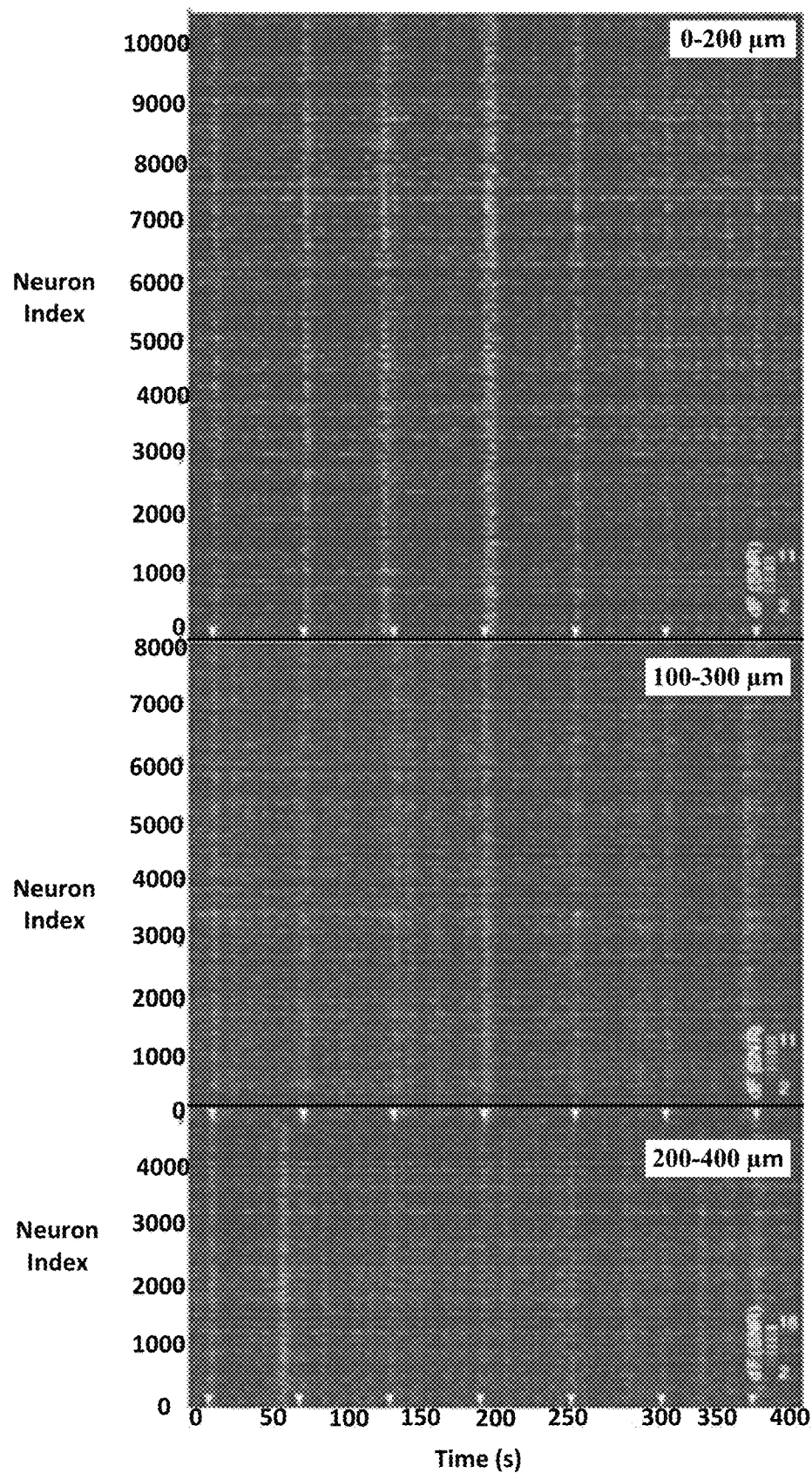

The MesoLF custom tube lens 125 of the optical path 100 discussed above enables the well-corrected wide-field imaging capabilities discussed above. The MesoLF includes a software and/or hardware implemented computational pipeline for processing the imagery collected using the customized optical path 100. The example MesoLF computational pipeline 200 (also referred to herein as an "image analysis pipeline") shown in FIG. 2A is configured to maximize localization accuracy and signal extraction performance at depth in scattering tissue and addresses the challenges associated with scaling the current LFM reconstruction approaches[21,22] to mesoscopic volumetric FOVs. Briefly, after tiling the FOV into 6×6 patches, correcting for motion, subtracting the global dynamic background, and masking out vasculature pulsation, the MesoLF pipeline generates a temporally filtered activity summary image in which the weakly scattered LFM footprints of active neurons are emphasized relative to the strongly scattered background. A novel phase-space-based LFM deconvolution approach generates a volumetric estimate of the active neuron locations while rejecting fluorescence background from above and below the imaged volume. Subsequent morphological segmentation allows shape-based identification of neuron candidates and their surrounding volumetric neighborhoods ("shells"), and the expected footprints of these neuron and shell candidates in the LFM raw data are estimated. At the core of the pipeline lies an iterative demixing step in which the spatial and temporal components are alternatingly updated while keeping the respective other fixed. Crosstalk between core and shell components is demixed, and finally, the resulting traces are classified using a convolutional neuronal network.

Figure 3A:
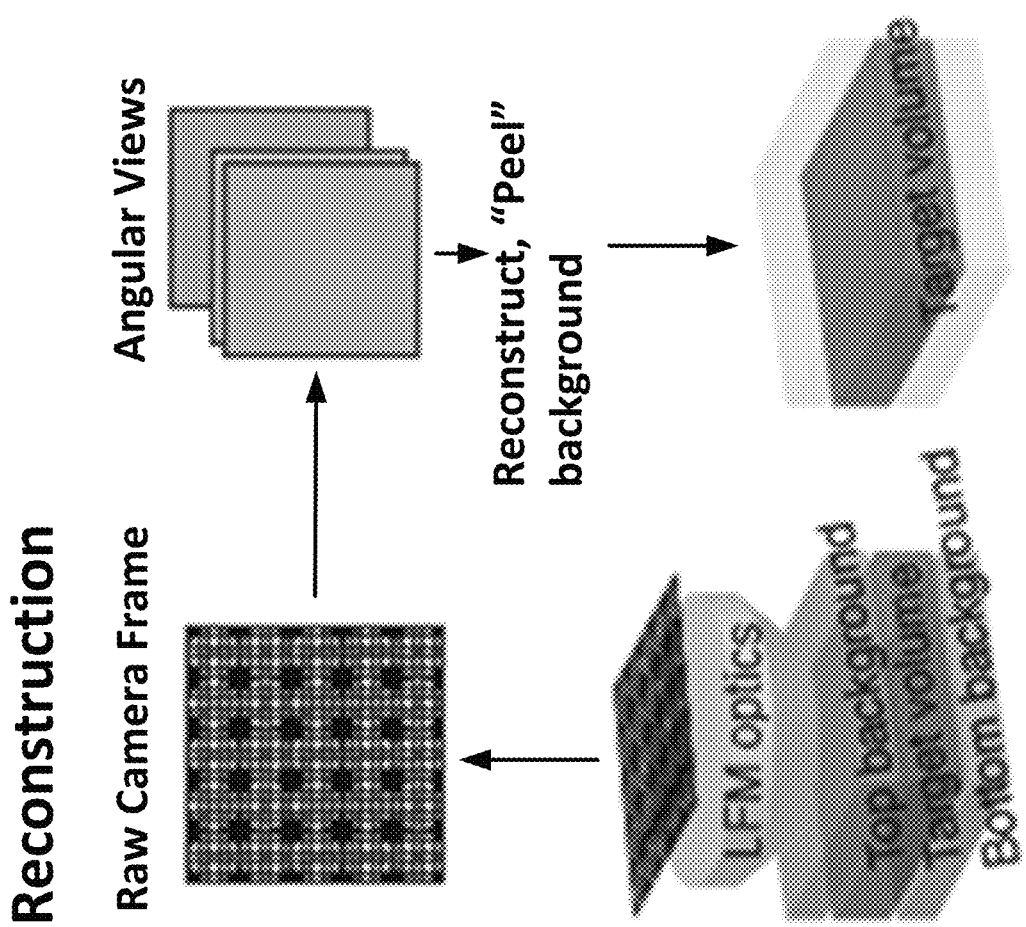
FIG. 3A is a diagram of an example phase-space reconstruction technique that may be implemented by the MesoLF computational pipeline.
Figure 3B:
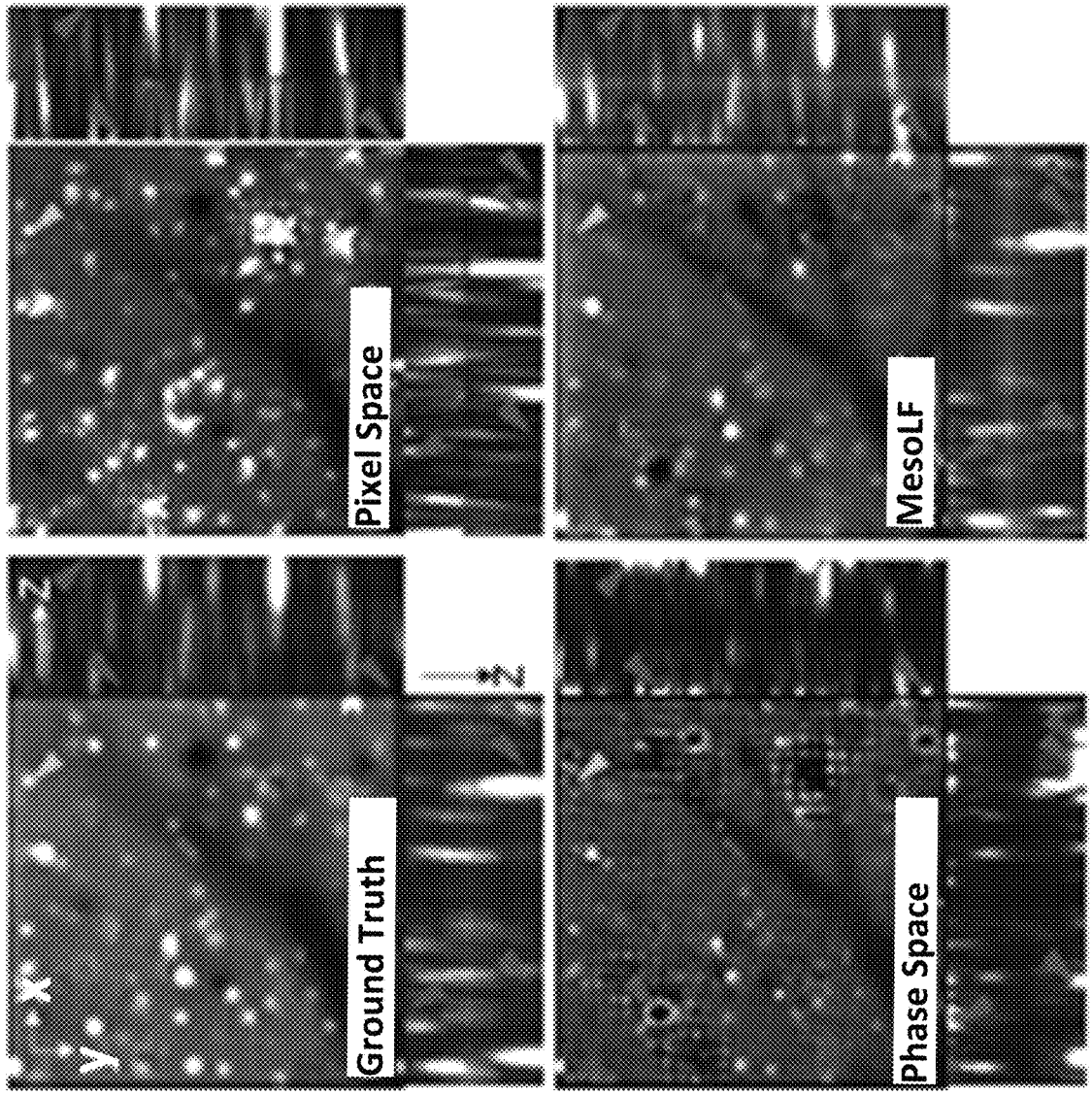
FIGS. 3B, 3C, 3D, and 3E are diagrams showing that phase-space reconstruction together with background peeling visibly reduces artifacts compared to conventional light field microscopy reconstruction as well as to a previously published phase space reconstruction approach.
Figures 3C, 3D, 3E:
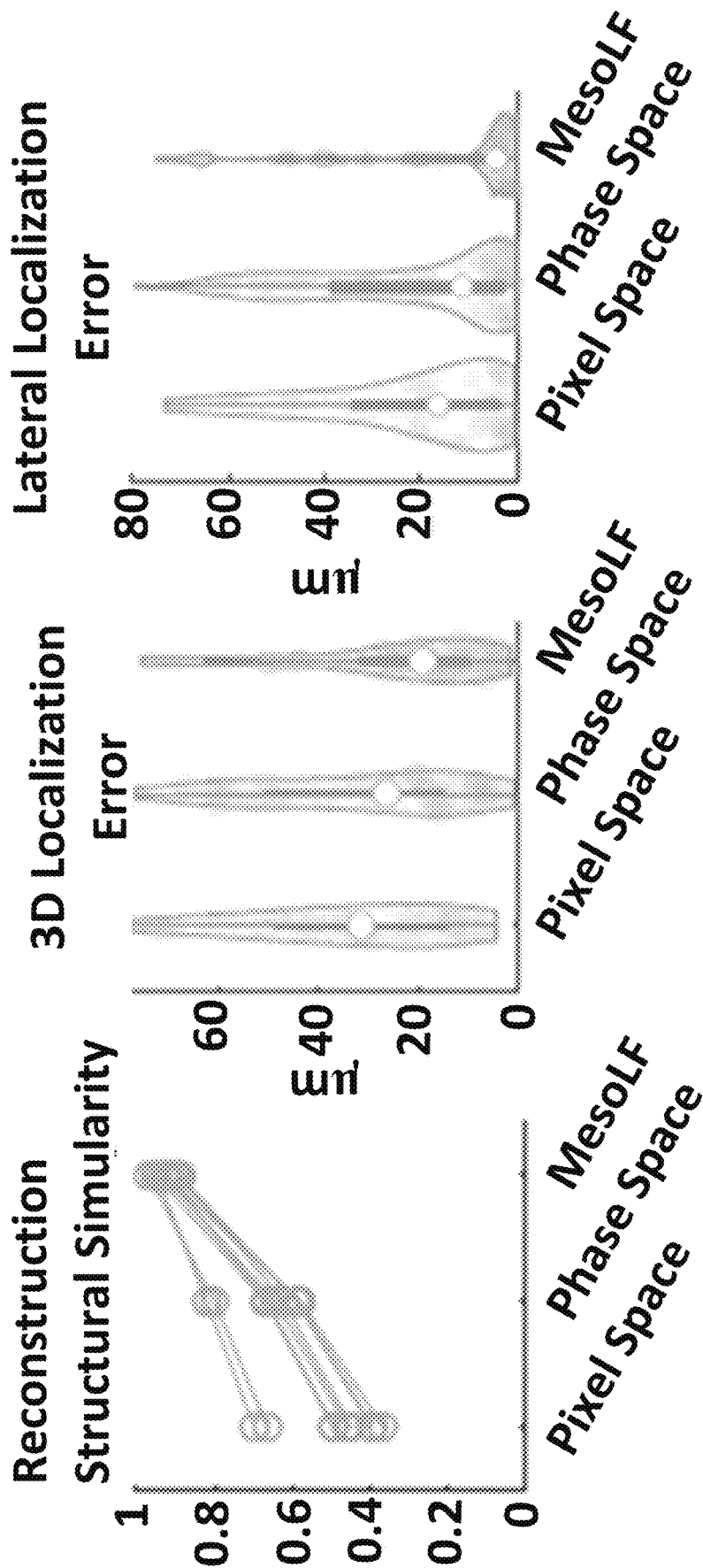
Figure 3K:
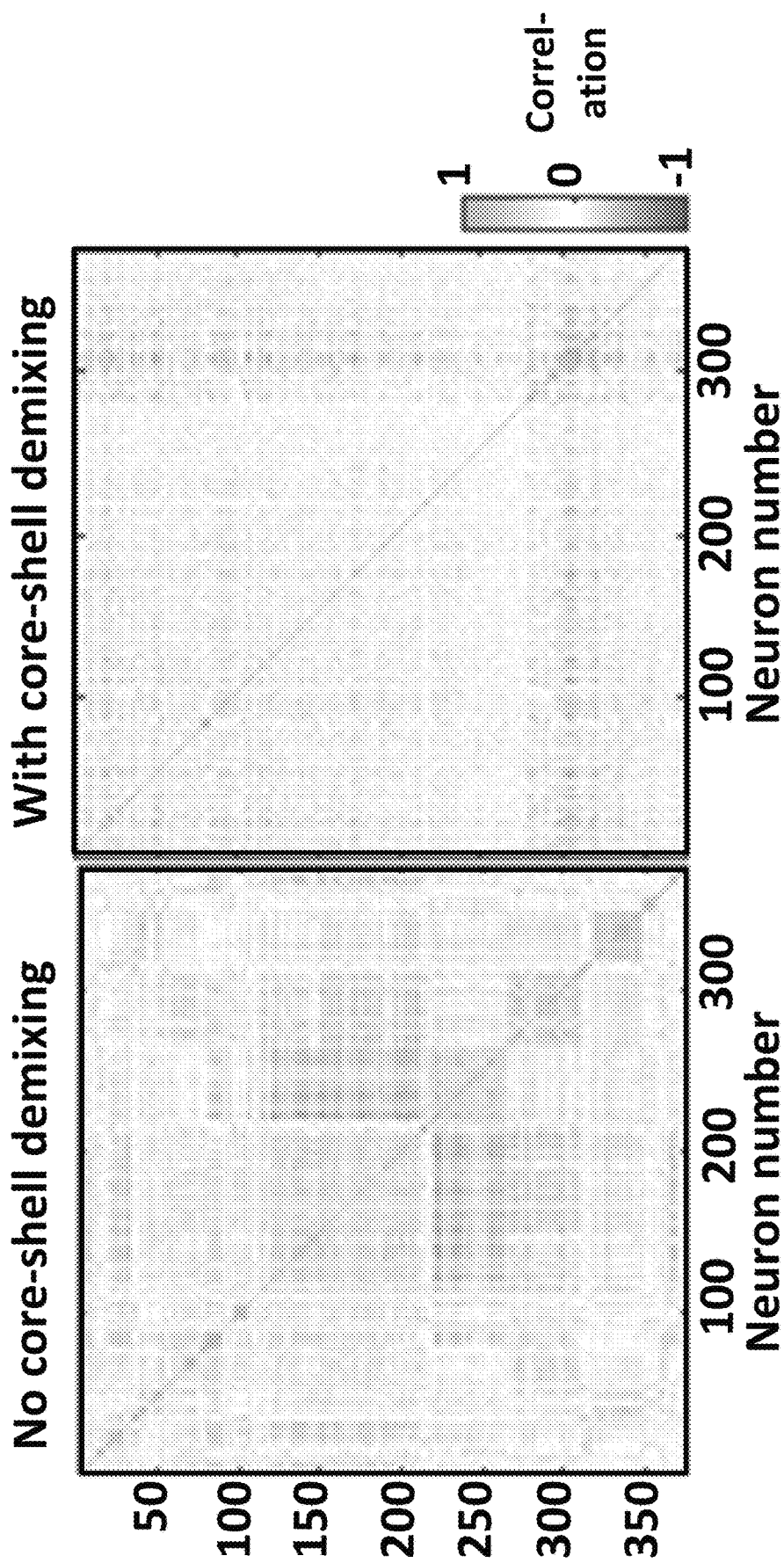
Figure 3L:
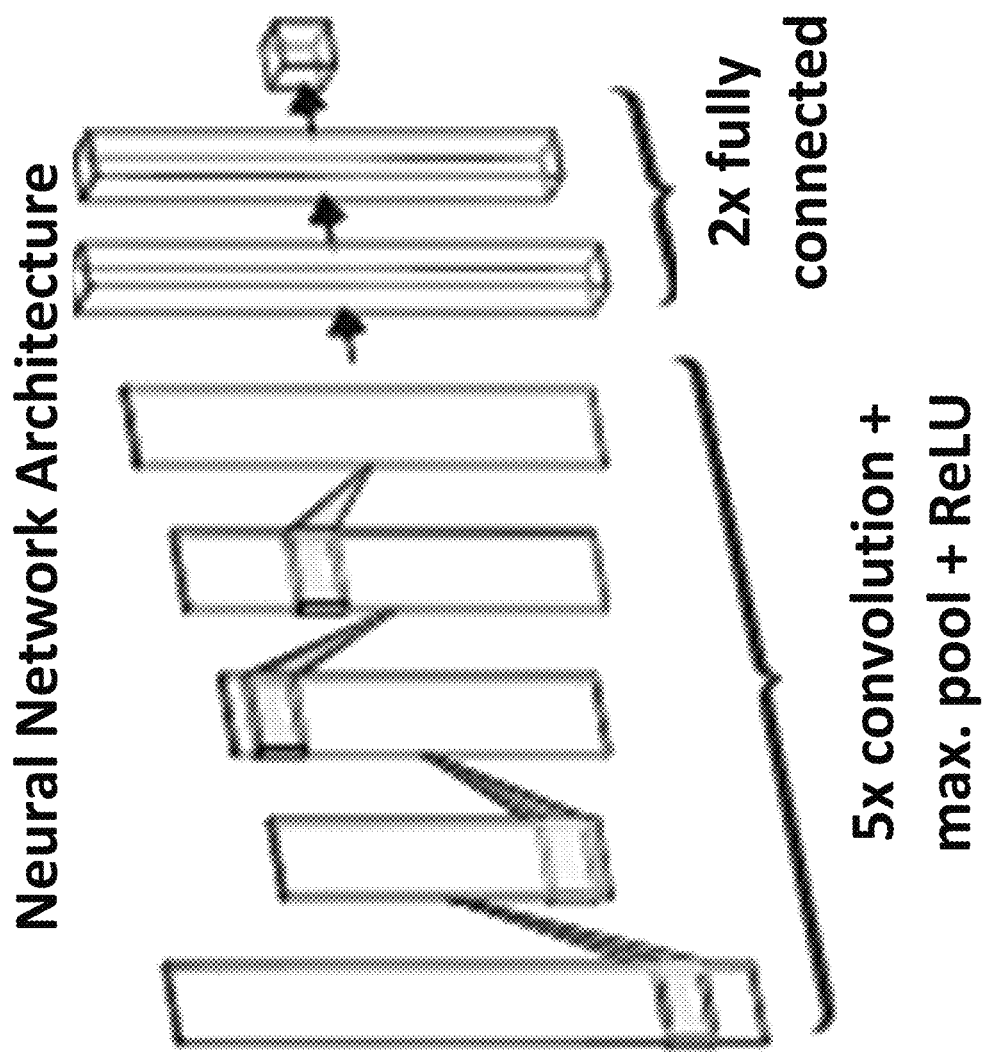
FIGS. 3L, 3M, and 3N are diagrams showing examples of trace classification via convolutional neural network by the MesoLF computational pipeline.
Figure 3M:
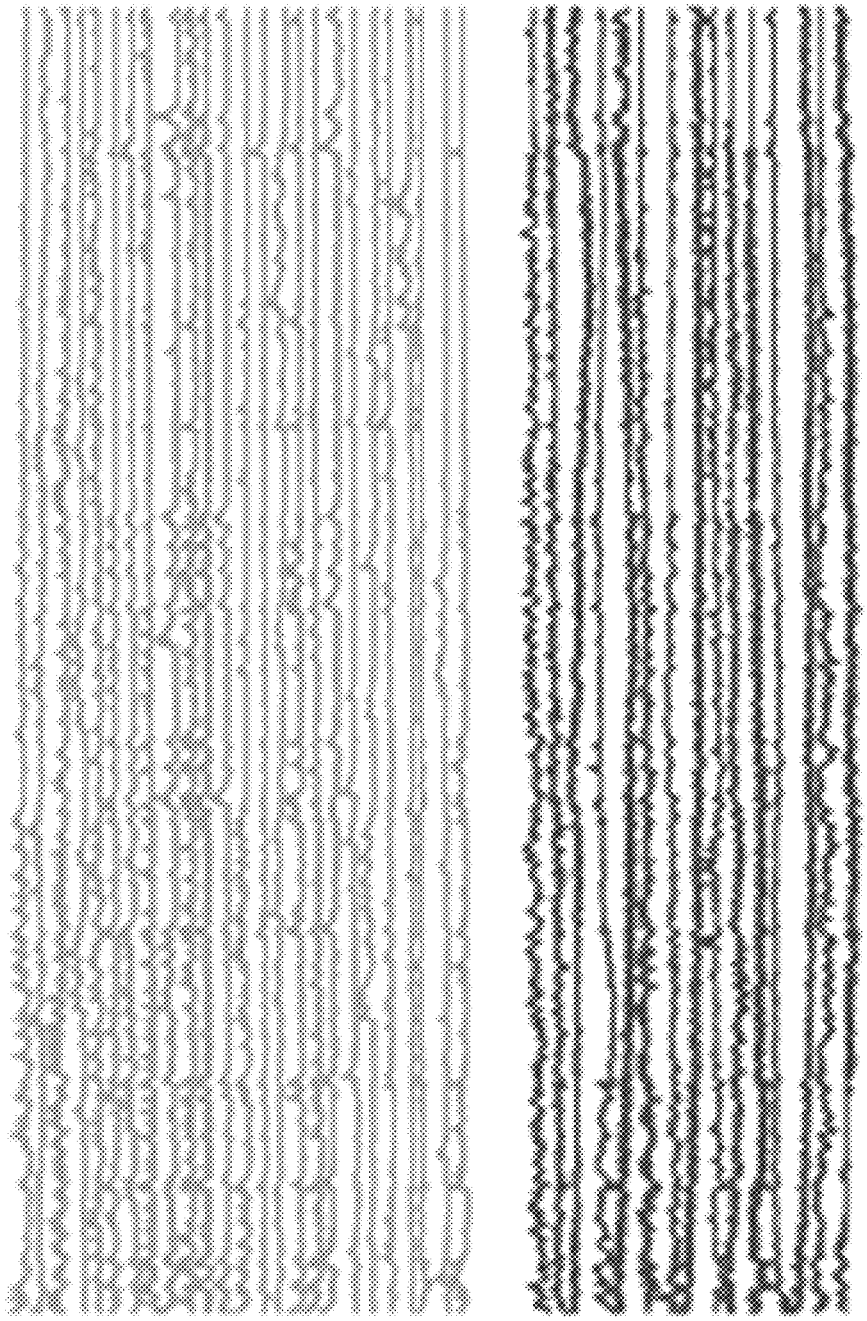

The achievable neuron detection sensitivity, signal extraction quality, and neuron localization accuracy at depth in LFM is ultimately limited by reconstruction artifacts due to scatter-induced aberrations as well as by crosstalk between neurons, neuropil, and background activity above and below the imaged volume. MesoLF addresses these limitations through the following four key conceptual advances:

First, to reduce reconstruction artifacts that are typical of conventional LFM reconstructions—in particular those affected by light scattering—without resorting to computationally costly regularization constraints, the input data is transformed into a phase-space representation in which the different angular views of the source volume encoded in an LFM raw image are treated separately and thus can be filtered, weighed, and updated in an optimized sequence (FIG. 3A). In addition, a novel "background peeling" algorithm is provided in which fluorescent contributions from above and below the target volume are estimated and subtracted. Such out-of-volume background fluorescence is a key limiting factor of the performance of reconstruction algorithms, which try to explain the observed background signal by allocating it to within-volume features and thus generating reconstruction artifacts. Phase-space reconstruction together with background peeling visibly reduces artifacts compared to conventional LFM reconstruction as well as to the previously published phase space reconstruction approach (FIG. 3B) and significantly improves the well-known structure similarity index measure between reconstruction and ground truth for a depth range of 300-400 μm by 88% while reducing the neuron localization error by 64% (FIGS. 3C-E). Furthermore, the neuron identification precision (positive predictive value) is improved by 42% and sensitivity (true positive rate) by 144%.

Second, the provided morphology-based segmentation implementation (FIGS. 3F-H) allows for applying priors on neuron shape and is capable of robustly processing volumes with dense neuron content (FIG. 3F). Compared to the spatiotemporal matrix factorization approaches that have previously been suggested as a way of segmenting active neurons[36,23], our purely shape-based approach is not prone to producing segments containing multiple neurons when their temporal activity is highly correlated because it does not rely on temporal independence (FIG. 3G) and overall achieves superior neuron detection performance relative to a comparable one-photon segmentation algorithm (FIG. 3H). Since segmentation is performed on a reconstruction of a filtered temporal activity summary image, the blurring effects of scattering are strongly suppressed. The reconstruction and segmentation steps have been optimized based on simulations of a realistic optical tissue model.

Third, for each of the detected neuron candidates, a spherical shell surrounding the neuron is generated, and both the neurons and shells are convolved with the LFM PSF to generate a library of initial LFM footprints (FIG. 3I). This library of spatial footprint components and associated temporal activity components is then iteratively refined through alternating updates of the spatial and temporal components. Each of the alternated sub-problems is formulated as a so-called LASSO-constrained optimization to encourage sparsity. The spherical shells are included in the demixing so that they can accommodate the local background that arises from crosstalk from neighboring neurons. After the main demixing stage, these local background contributions are demixed from the neuron activity temporal components through a greedy search approach.

Figure 3N:
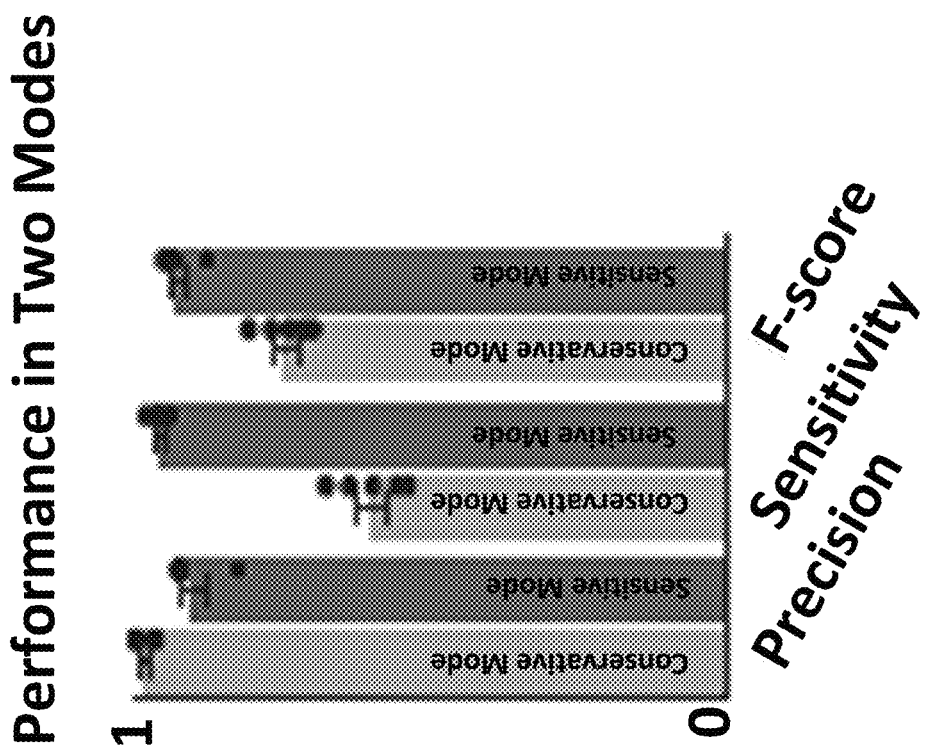
Figure 30:
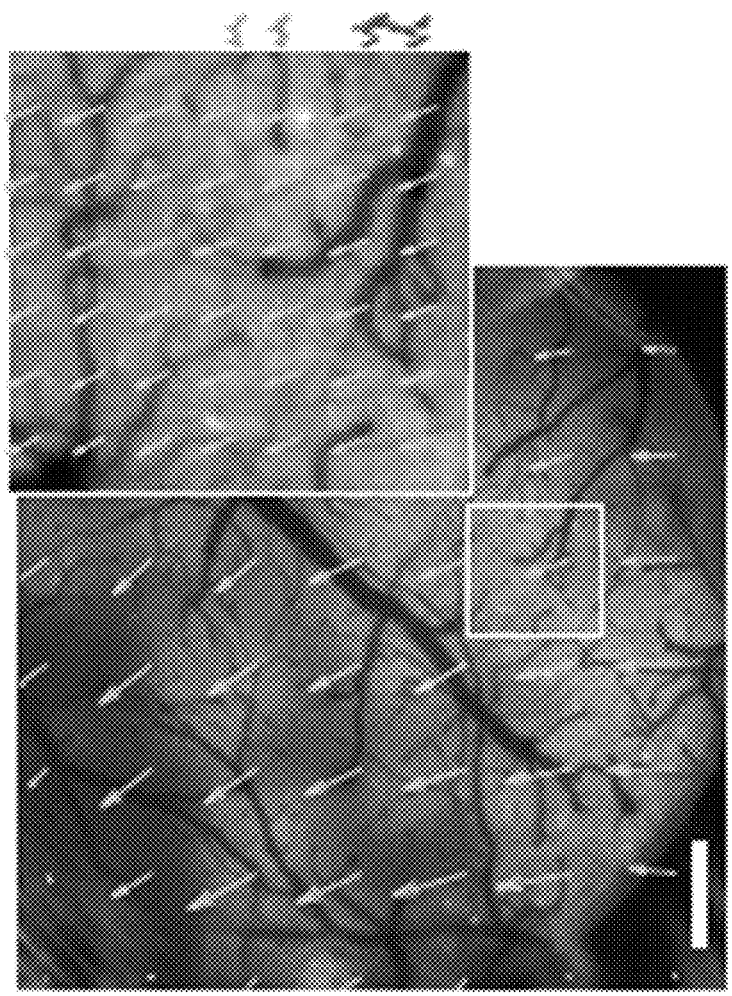
Figure 3P:
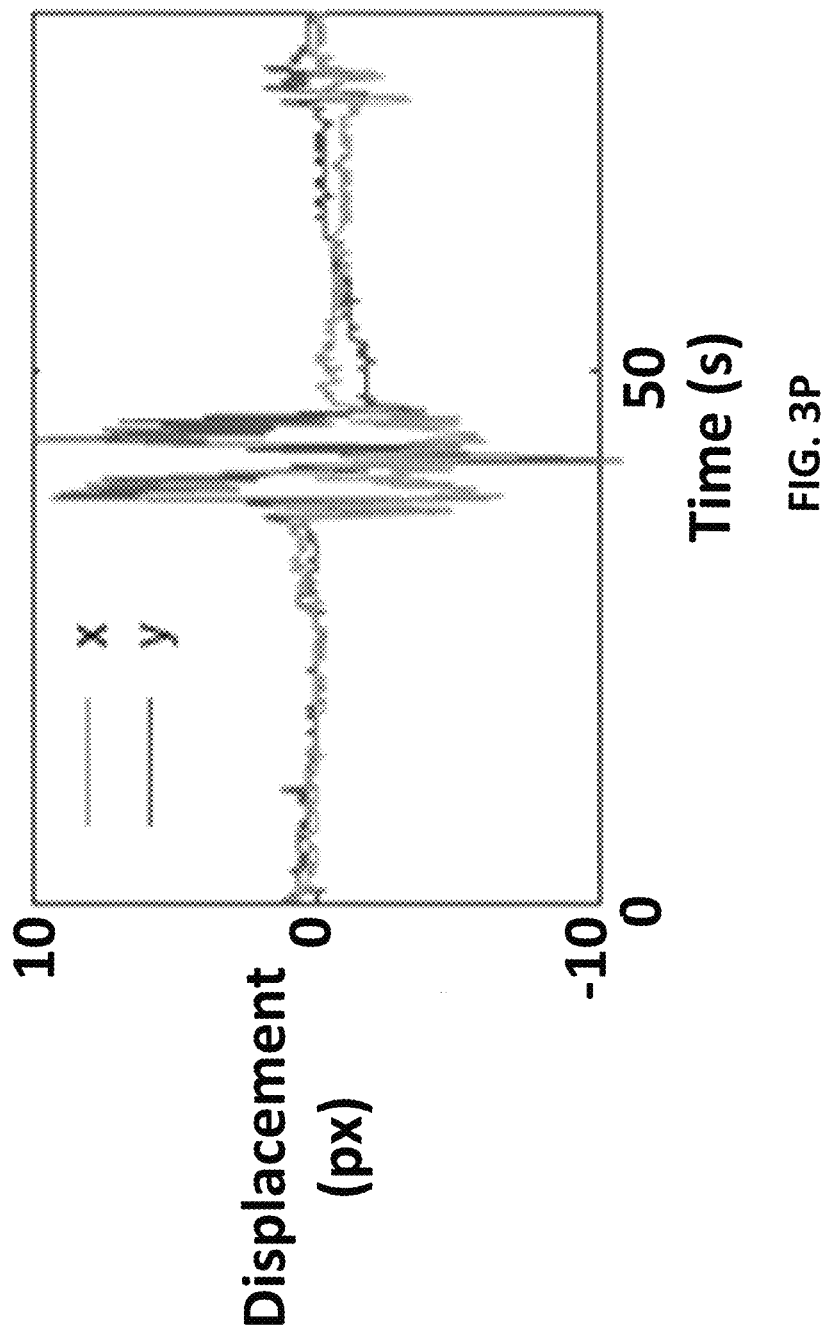
Figure 3Q:
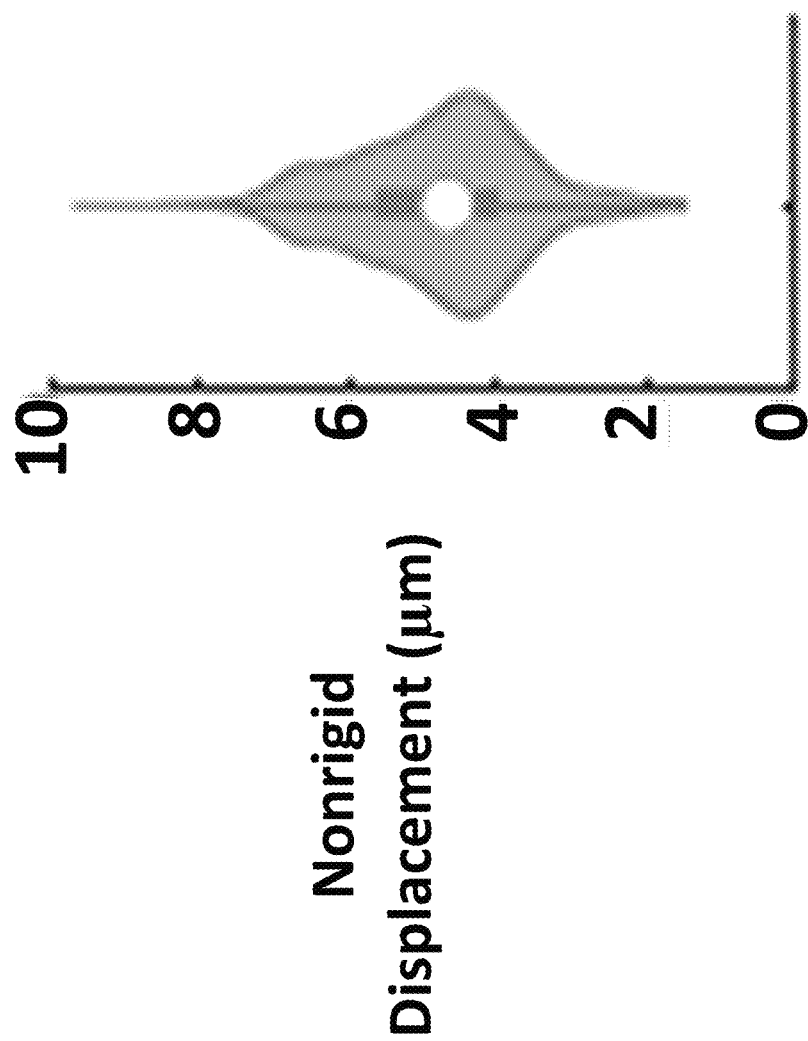

Finally, to further reject signals arising from non-neuron sources, such as blood vessel pulsation and residual motion, it is beneficial to classify the candidate traces based on whether their temporal activity patterns are compatible with the known response characteristics of GECIs. Several packages exist that allow fitting time series with models of the GECI response but are insufficiently selective to robustly reject artefact signals. To address this technical problem, a convolutional neuronal network (CNN) was designed and trained on a hand-curated dataset, which is discussed in detail in the Candidate Classification using Supervised Machine Learning section. The provided CNN achieves a classification performance (F-score) of 93% (see FIG. 3N, sensitive mode).

Scaling computational functional imaging at neuronal resolution from sub-millimeter to mesoscopic FOVs in the mammalian brain poses unique challenges related to both the intrinsic properties of brain tissue at multi-millimeter scale and the computational scale of the task. Relative displacements due to non-rigid deformation of the brain that arise from animal motion and skull deformations can be as high as ~10 μm when imaging the brain over multi-millimeter distances. It is therefore imperative to carefully correct for these deformations to enable mesoscale neuronal resolution imaging. Furthermore, while large blood vessels can usually be avoided in methods covering smaller FOVs, mesoscopic FOVs will always contain a number of large vessels, which cause, if unmitigated, non-rigid deformation and pulsating shadowing effects that will result in false neuronal signals.

The MesoLF pipeline, addresses these challenges as follows: Performing non-rigid motion correction in LFM has previously been hampered by the computational cost of frame-by-frame reconstruction as would be required to make LFM data compatible with established motion correction algorithms. MesoLF overcomes this limitation by performing non-rigid motion correction on raw LFM data and by transforming them into the so-called phase space representation in which raw image pixels are re-ordered to form a set of sub-aperture images, each representing a different angular perspective onto the sample. The MesoLF pipeline then corrects for motion and deformations of the phase space slice corresponding to the oblique perspective and applied the same correction to each of the other phase space slices.

Figure 3R:
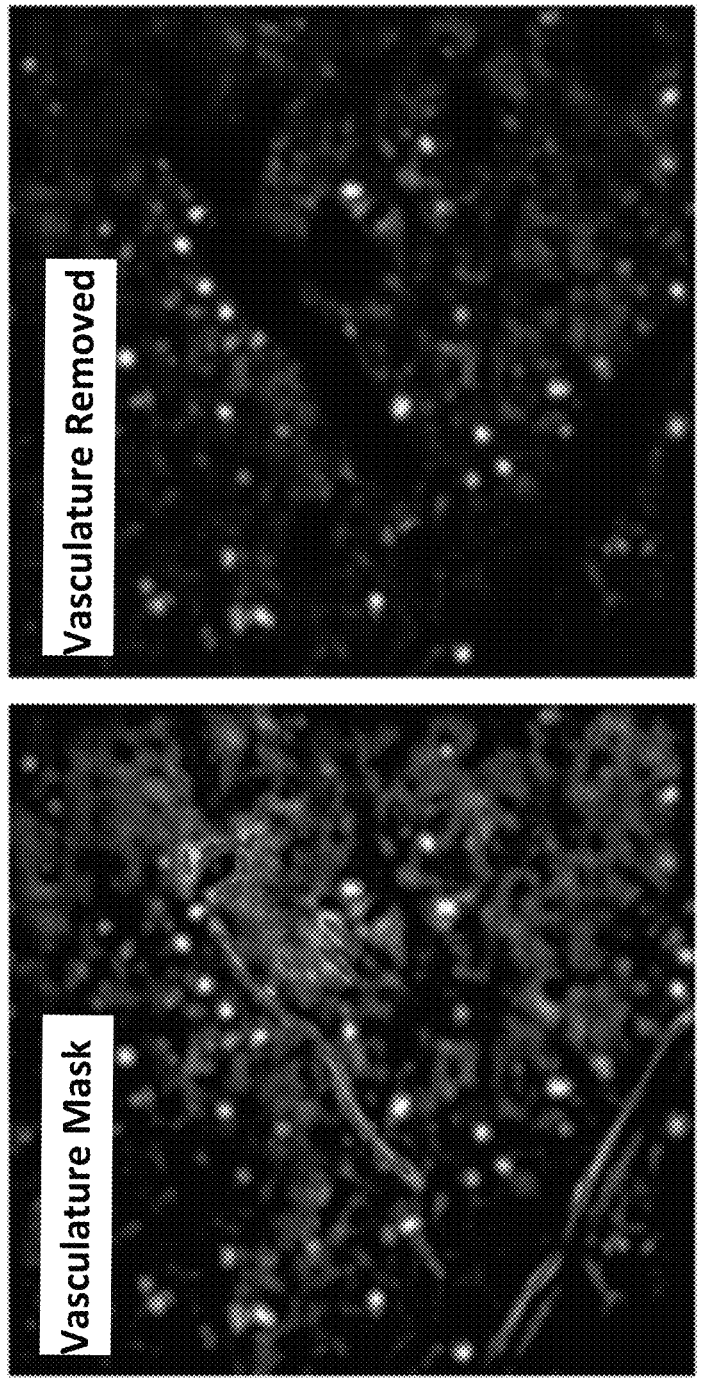
FIG. 3R is a diagram showing an example of vascular masking by the MesoLF computational pipeline.

To avoid artifacts generated by the periodic pulsation of the vasculature, the MesoLF pipeline implements a four-pronged approach. First, blood vessels are detected and masked based on their tubular shape (FIG. 3R). Second, all single-pixel time series are filtered to remove low-frequency oscillations originating from pulsation. Third, remaining spatial features that originate from blood vessel motion are rejected during morphological segmentation based on their shapes. Finally, the aforementioned CNN-based time series classifier serves to further reject blood vessel artifacts.

To computationally extract neuronal signals and locations from the ~20 Gigabit/s raw camera data stream would require prohibitively large computational resources if performed on the basis of the conventional LFM frame-by-frame reconstruction method. Our vastly more efficient SID implementation can perform signal extraction on a smaller, 500×500×200 μm$^3$ FOV within few hours on a multi-GPU workstation. In MesoLF, however, the FOV area and hence dataset sizes are ~64× larger when imaging at the same frame rate. Thus, to enable practical applications of the MesoLF techniques, the computational efficiency was significantly enhanced in our MesoLF pipeline. To this end, the MesoLF computational pipeline provides an accelerated and parallelized scheme that employs a custom GPU-based implementation of the most performance-critical function, a special convolution-like operation required for propagating a light field from the sample to the LFM camera and vice versa. In addition, the full FOV is sub-divided into 6×6 overlapping tiles that can be processed in parallel on multiple GPUs and subsequently merged to avoid duplicate neurons. Tiles of other sizes may be utilized in other implementations. When compared to the current release of the SID algorithm (which already requires three orders of magnitude less computation time than conventional frame-by-frame reconstruction of LFM recordings), MesoLF achieves a 63% reduction in CPU core-hours and a 95% reduction in GPU runtime or, correspondingly, a 1.6-fold and a 20-fold speedup at the same computational resources while performing a range of qualitatively new functionalities and achieving a quantitatively better performance. MesoLF thus elevates neuron-resolved, fast computational imaging capacity to the mesoscopic scale.

FIG. 2A is a diagram that shows an example implementation of the computational pipeline 200. MesoLF optical components 205 shown in FIG. 2A may be implemented by the MesoLF optical path 100 discussed in the preceding examples. Fluorescence from the sample may be imaged through the custom-designed optical system (FOV ø4 mm, NA 0.4) and light-field microscope (LFM) detection arm, captured on a CMOS camera (~50 M pixels per frame, 6 μm pixel size, 18 fps) and streamed to a flash disk array. The MesoLF optical components 205 capture the raw data of the volume of the sample being imaged. In this example, the MesoLF optical components 205 are used to capture neurons in scattering brain tissues. However, other implementations may be used to image components of other types of scattering materials which cause the scattering of light. The scattering properties may vary depending upon the type of material being scanned.

The tiling unit 210 is configured to sub-divide the full FOV data into a plurality of overlapping tiles or patches that may be processed in parallel on multiple GPUs of a multi-GPU workstation. The tiles may be subsequently merged to avoid duplicate neurons. In the example shown in FIG. 2A, the full FOV data is subdivided into a plurality of 6×6 tiles. However, other implementations may utilize tiles of a different size.

The non-rigid motion correction unit 215 is configured to perform motion correction on the tiled data obtained from the tiling unit 210. When imaging awake, behaving animals, rigid motion correction of functional imaging data is usually necessary, even at smaller FOVs. However, at the larger FOV provided by MesoLF, rigid motion correction is insufficient and non-rigid deformations are routinely observed on a scale similar to the size of a neuron.

The non-rigid motion correction unit 215 may be configured to rearrange the pixels in the raw image into a 2D array of sub-aperture images. A sub-aperture image consists of all the sensor pixels that have the same position relative to their nearest microlens. If there are M×M microlenses and the image formed by each is sampled using N×N sensor pixels, then the raw image (which has dimensions M×M×N×N) can be rearranged into N×N sub-aperture images with dimensions M×M each. Each sub-aperture image corresponds to a perspective view onto the sample from a specific angle.

The non-rigid motion correction unit 215 may then perform motion registration on the central sub-aperture image, which consists in the central pixel behind each microlens. The FFT-based registration pipeline NoRMCorre may be used to obtain the non-rigid motion information, which is then applied inversely to all the sub-aperture images. Subsequently, the images are rearranged into the original LFM raw image pixel arrangement. After motion correction, the correlation between subsequent frames of the central sub-aperture images is increased compared to the raw data. The motion correction section below provides additional details of the operations that may be performed by the non-rigid motion correction unit 215.

The global background subtraction unit 220 may then subtract fluorescence contributions from the background from the motion-corrected tiled data. The global background subtraction unit 220 may be configured to use a low-rank matrix factorization to estimate the background. The global background subtraction unit 220 may then subtract the background from the motion-corrected data. The background-subtracted data may then be processed by the shape-based vasculature filter unit 225.

The shape-based vasculature filter unit 225 may be configured to detect and mask blood vessels included in the tiles. The shape-based vasculature filter unit 225 may be configured to correct for temporal modulation in emission brightness caused by the periodic expansion and contractions of blood vessels so that such activity is not incorrectly identified as neural activity. The shape-based vasculature filter unit 225 may be configured to use the B-COSFIRE filter to highlight blood vessels for subsequent thresholding and masking. The Blood Vessel Rejection section which follows discusses additional details of how the effects of blood vessels may be removed.

The filtered activity summary image unit 230 may be configured to process the image data to emphasize aspects of the image data which are neurons and reject noise. Neurons may be surrounded by temporally active neuropil, and light scattering in brain tissue blurs images of the neuron cell bodies and mixed the ballistic cell body images with scattered photons which may originate from other neurons. The filtered activity summary image unit 230 may be configured to remove low-frequency and high-frequency noise and compute a temporal activity summary image in which temporally active pixels are highlighted. The Summary Image Generation section which follows describes additional details of the summary image generation that may be performed by the filtered activity summary image unit 230. The summary image will be further processed by other components of the computational pipeline 200.

The background-rejecting phase-space reconstruction unit 235 implements a novel phase space reconstruction technique that may be used separate background light that is not global background light (which was removed by the global background subtraction unit 220). Instead, the background-rejecting phase-space reconstruction unit 235 may be used eliminate fluorescence emanating from tissue above and below the target depth range for the LFM reconstruction. Such out-of-range signals may occur because it is difficult to confine the axial extent of the illumination provided in one-photon imaging. The out-of-range signals mix with in-range signals, which degrades the reconstruction contrast and reduces the signal-to-background ratio. Furthermore, blood vessels in superficial tissue layers expand and contract periodically and thus may generate a temporally modulated shadowing effect for fluorescence emanating from further below. To address this problem, the background-rejecting phase-space reconstruction unit 235 constructs a 3D volume containing the active neurons using a novel artifact-free phase-space reconstruction algorithm that performs background-peeling in which temporally variable background above and below the target volume are estimated and subtracted. Additional details of the techniques applied by the background-rejecting phase-space reconstruction unit 235 are discussed in the Phase-Space Deconvolution with Background Peeling section which follows.

The morphological segmentation unit 240 analyzes the reconstructed output from the background-rejecting phase-space reconstruction unit 235 to perform shape-based identification of neuron candidates and their surrounding volumetric neighborhoods ("shells"). The morphological segmentation unit 240 estimates the expected footprints of these neuron—and shell candidates in the LFM data. An example process that may be implemented by the morphological segmentation unit 240 is shown in the Morphological Segmentation section which follows in which a 2D planar segmentation analysis is performed and by convolving each plane with a first kernel associated with the expected shape of a neuron and a second kernel associated with the expected shape of the neuropil or shell region that typically surrounds a neuron. After plane-wise segmentation, the morphological segmentation unit 240 clusters and merges the 2D segments based on spatial proximity in 3D. The center of merged patches in 3D space is taken as the brightness-weighted center of the voxels in the patch. After merging, the morphological segmentation unit 240 determines a 3D footprint for each of the resulting neuron candidates in the volume, which may then be used subsequently in the main demixing step of the MesoLF computational pipeline 200.

The spatial-temporal demixing unit 245 may be configured to demix and perform background rejection on the segmented data provided by the morphological segmentation unit 240. Temporal traces extracted from LFM data are prone to be contaminated by signals arising from surrounding neuropil (dendrites and axons) due to scattering spreading fluorescence photons originating from neuropil into the image of the soma, causing uneven baselines and crosstalk. The spatial-temporal demixing unit 245 may be configured to explicitly take neuropil contamination into account and provide a robust tool to reject these background components and restore low-crosstalk soma signal traces. The spatial-temporal demixing unit 245 may be configured to compute both the neuron and neuropil footprints as they would appear on the LFM sensor before the main demixing procedure and may use non-negative matrix factorization with sparsity regularization to demix the neuron and shell components at the same time. For each candidate neuron and its local surrounding shell, a mask may be generated that represents its anticipated spatial footprint in the LFM camera data. In an iterative optimization scheme, these spatial footprints and the corresponding activity time series may be updated, thus demixing the neuronal activity signals present in the recording. The Demixing and Background Rejection section which follows describes examples of the techniques that may be implemented by the spatial-temporal demixing unit 245.

The local soma-neuropil demixing unit 250 may be configured to further demix the resulting neuron- and background-shell signals are further demixed from each other by solving an optimization problem that seeks to reduce crosstalk between neurons and the local background shell components. The Demixing and Background Rejection section describes examples of the techniques that may be implemented by the soma-neuropil demixing unit 250.

The merge tiles unit 255 merges the tiles that were split up by the tiling unit 210. The merge tiles unit 255 may be configured to check for duplicate candidate neurons which are close together in space and time and to merge those candidate neurons into a single neuron in the data.

The classification of activity traces unit 260 may use a machine learning model to differentiate between good and bad neuron traces. Despite several filtering and demixing stages throughout the MesoLF pipeline, after the final demixing step, a minor fraction of neuron candidate traces still exhibits features incompatible with GECI activity or are otherwise of low quality (low SNR). Therefore, after subtracting the neuropil background from the neuron candidates traces in the previous operations, the classification of activity traces unit 260 may classify traces based on their temporal shape and noise level. The temporal traces may be assigned to one of three categories: traces with low noise and few artifacts (high quality), traces with some noise and artifacts (low quality), and traces with high noise and large artifacts (false positives). To accommodate experimenter preferences, two pre-trained classifiers have been provided, one optimized to be "sensitive", i.e., to keep traces with both high and low quality, and one optimized to be "conservative", i.e., to keep only traces with high quality scores. In implementations where only high-SNR traces are of relevance, the conservative approach may be more appropriate.

The machine learning model may be a convolutional neural network (CNN), which was trained using manually labeled training data that includes traces. Additional details of the training of the CNN and example operations that may be performed by the classification of activity traces unit 260 are discussed in detail in the Candidate Classification using Supervised Machine Learning section which follows.

Performance Testing and Verification of the MesoLF

Figure 3S:
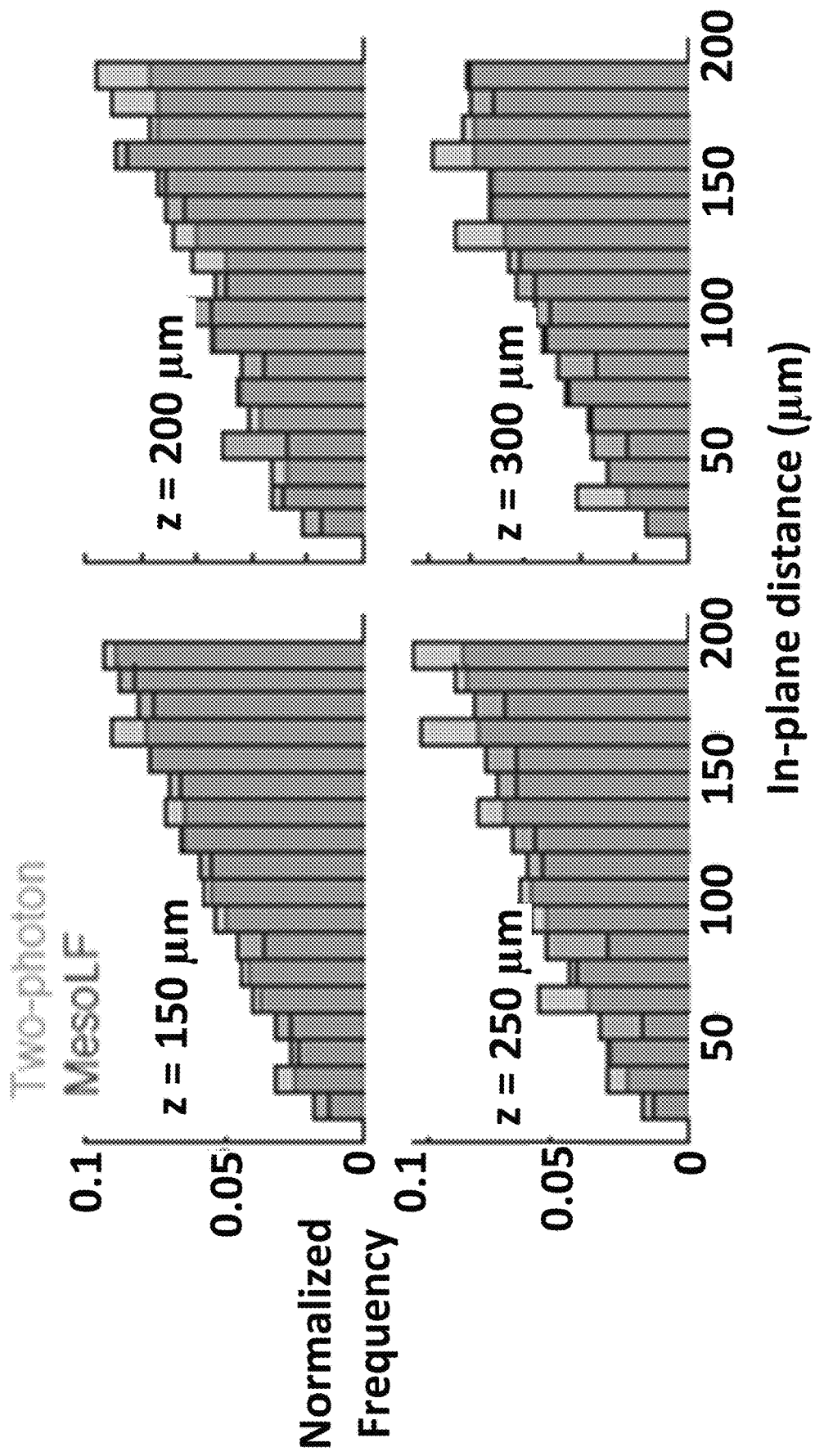
FIG. 3S is a diagram comparing the pairwise distance distributions for neurons detected in a set of recordings captured using two-photon microscopy (2 pM) and MesoLF.

The performance of a number of key reconstruction and signal extraction modules in our pipeline were previously quantitatively verified and established using simultaneous LFM and functional ground truth recording via two-photon microscopy (2 pM). The performance of our MesoLF reconstruction pipeline as a whole was also verified by comparing our results to 2 pM data. Using the same animals, after performing MesoLF imaging, single-plane time series recordings were recorded at four different depths (150, 200, 250, 350 µm; 6.4 frames per second, 2×2 mm FOV), followed by neuronal segmentation using the CalmAn package. The pairwise distance distributions for neurons detected in each of the recordings were compared and find high level of agreement at all examined depths (FIG. 3S).

Figure 3T:
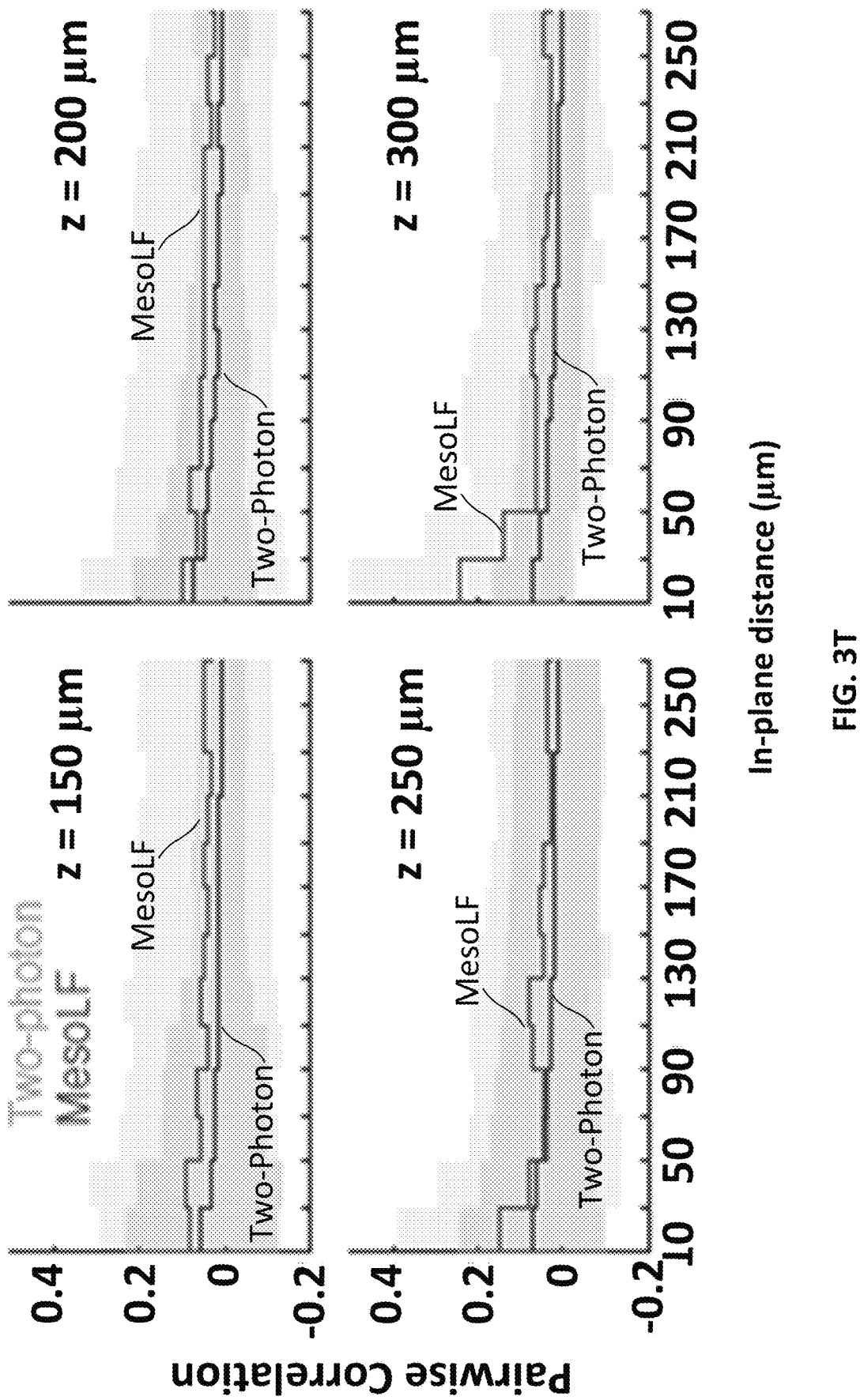
FIG. 3T is a diagram showing cross-correlations between all pairs of neuronal signals versus lateral neuron pair distance for the 2 pM-recorded data and the signals from MesoLF recordings at the same depths.

To verify the fidelity of the extracted signals, the cross-correlations between all pairs of neuronal signals versus lateral neuron pair distance for the 2 pM-recorded data and the signals from MesoLF recordings at the same depths were examined (FIG. 3T). Only at greatest recording depth of 300 µm was it found that that the median cross-correlation value for neuron pairs tends to increase at distances of fewer than ~30 µm in MesoLF recordings relative to the 2 pM data, indicating MesoLF's ability to achieve accurate spatial discrimination and neuronal signal extraction compatible with cellular resolution recordings.

In summary, our MesoLF solution accomplishes mesoscopic high-speed functional imaging of up to 10,500 neurons within volumes of ø4000×200 µm located at up to ~400 µm depth at 18 volumes per second in the mouse cortex, with only workstation-grade computational resources. This performance is enabled by key advancements in our custom optical design and computational reconstruction and neuronal signal extraction pipeline: the provided novel background-rejecting phase-space reconstruction algorithm that is optimized for robustness in the presence of scattering and thus reduces reconstruction quality by 88% and neuron localization error by 64% in tissue simulations. Second, the provided novel morphological segmentation approach that effectively rejects blood vessel-induced artifacts, does not rely on temporal independence of signals from neighboring neurons and outperforms a comparable one-photon segmentation algorithm by 22% and 44% in the F-score metric at depths 100 µm and 300 µm, respectively (FIG. 3H; data for depth 300 µm not shown). Third, the provided core-shell local background demixing solution, which reduces neuropil-neuron crosstalk by 37%. Efficient parallel processing and a custom GPU-accelerated implementation of key processing steps decreases GPU computation time by 95% and CPU core-hours by 63% compared to our previous LFM-based signal extraction solution while boosting the scope, functionality, and performance of signal extraction qualitatively and quantitatively.

By entirely avoiding the inverse cubic scaling relation between volumetric frame rate and side length of the imaging volume that is inherent to serial scanning approaches, the MesoLF concept is uniquely positioned to fully capture the higher temporal bandwidth (~500 Hz) offered by genetically encoded voltage indicators, the majority of which are currently optimized for one-photon imaging only, across large volumes in scattering tissue. The achievable frame rate in MesoLF is limited by the number of photons that can be detected per frame while keeping the excitation power and resulting bleaching rate sufficiently low. MesoLF performance will therefore greatly benefit from cameras with improved quantum efficiency, reduced read noise, and faster readout speeds. Here it is shown that the performance of MesoLF using GCaMP at up to ~400 µm depth in the scattering mouse brain, limited by loss of directional information of the scattered photons. The obtainable depths can thus be expected to be further increased in the future by using more efficient and red-shifted indicators.

While several aspects of the MesoLF pipeline are specifically designed to tackle issues arising from large-FOV imaging, the general performance improvements afforded by the implementations provided herein will also benefit smaller-scale LFMs, such as our head-mounted MiniLFM device. The MesoLF optical and optomechanical design will be available under an open-source license and the custom tube lens will be commercially obtainable. To facilitate effortless dissemination of our computational pipeline, a readily deployable container may be provided that can be run on common cloud infrastructures, thus lowering the entrance barrier to performing long-duration and high-throughput recording of volumetric calcium activity at mesoscopic FOVs.

Optical Design and Data Acquisition

The MesoLF optical system shown in FIG. 1A may been implemented on the widely used commercial "2p-RAM" multiphoton imaging platform. In some implementations, the MesoLF optical system is entirely mounted onto the 2p-RAM vertical breadboard which can be translated along three axes and rotated around one axis via a motorized gantry, although other mounting solutions are possible, including simple static mounting on a fixed breadboard.

The 2p-RAM optical system consists of the excitation laser path, the objective, and the fluorescence detection arm. Of these major parts, MesoLF only uses the 2p-RAM main objective. The original 2p-RAM design also contains a simple, low-resolution wide-field one-photon imaging arm for sample positioning and focusing. The MesoLF excitation and imaging path is mounted in place of this original wide-field arm. Besides its volumetric light field imaging capability, the MesoLF camera signal can also be used directly for sample positioning, thus taking over the function of the original wide-field arm. With the microlens array in place, the camera captures an LFM image, i.e., the image appears segmented into illuminated circles forming behind each microlens. The lateral spatial information that is directly present in this LFM raw image is still sufficient for sample positioning and focusing without any postprocessing, for example, by simply zooming out the camera stream display such that each microlens image circle appears as a single effective pixel to the experimenter. Alternatively, the light field refocusing algorithm may be run in real time to compute at wide-field focal slice from the LFM data.

The off-the-shelf back-to-back achromat pair used as a simple tube lens without specifically optimized corrections for high-resolution widefield imaging in the original design is replaced with a custom-designed tube lens system that corrects aberrations of the main objective, primarily in a 515-535 nm emission range of green (GCaMP) calcium indicators (sec further below). The tube lens also provides secondary corrections in the ~600-620 nm emission range of red calcium indicators (jRCaMP, jRGECO[6]).

MesoLF excitation and fluorescence light are coupled into/out of the 2p-RAM microscope "tube", i.e., the section between the main infrared/visible dichroic beamsplitter that is located just behind the main objective, and the first lens of the 2p-RAM PMT detection module, via a motorized 45-degree fold mirror. The 2p-RAM design already contains a motorized linear stage at this position for switching to the original wide-field arm. The original rigid mirror mount with an adjustable kinematic mount to allow precise positioning of the mirror at the intersection of the optical axes of objective and our custom-designed tube lens and at a 45-degree angle with respect to both axes. This alignment may be achieved by replacing the objective with a cage system containing two iris apertures that define the optical axis, centering a green alignment laser onto that axis, and overlapping the back-reflections from the various surfaces in the tube lens as seen on a card with a hole for the incoming laser beam, held below the fold mirror.

The MesoLF tube lens is the centerpiece of the optical system design provided herein. When used without a microlens array, the MesoLF tube lens upgrades the 2p-RAM to be a high-resolution mesoscopic wide-field microscope with a 10× magnification and diffraction-limited resolution at NA 0.4 across a 4-mm FOV.

The 2p-RAM objective is well-corrected for focusing the excitation laser beam at NA 0.6. In the GCaMP spectral range, however, axial and lateral chromatic aberrations, as well as spherical aberrations and coma, remain uncorrected so that the simulated resolution of the objective alone (assuming a paraxial tube lens) drops to less than ~70 line pairs per millimeter at NA 0.4, for a GCaMP-compatible emission band of 515-535 nm. The 2p-RAM objective is also not corrected for field curvature, with a sag of ~160 µm, curving towards the objective from the center of the 2p-RAM's 5-mm FOV. An additional difficulty arises from the relatively long distance of 210 mm between the objective and the closest position where a tube lens can be positioned, and the limited tube diameter and the size of the fold mirror, which restricts the achievable FOV-NA trade-off.

The custom MesoLF tube lens addressing all these issues consists of three cemented doublets in a configuration based on the Petzval objective design form. This lens corrects aberrations to such a degree that diffraction-limited resolution is restored at an NA of 0.4 up to a field radius of ~1.9 mm and reduces field curvature to ~60 µm (sag at center relative to edge of 4-mm FOV). This corresponds to a simulated resolution of ~600 line pairs per millimeter (lp/mm) across the full FOV of 4 mm in diameter. Tolerancing of this lens design was performed in in Zemax while mechanical design of the housing, further tolerancing, manufacturing, and optical verification was performed by Jenoptik Optical Systems. Anti-reflection coatings were applied to the lens elements to allow for >95% transmission in the wavelength range of 450-670 nm. In the 600-620 nm emission range of red calcium indicators, the tube lens is designed to achieve a resolution of ~500 lp/mm up to a FOV diameter of 2 mm. The outer surface of tube lens mount is threaded (thread size M75.5×0.5) to allow mounting into the 2p-RAM housing, replacing the original tube lens.

To hold the dichroic beamsplitter (Semrock FF505-SDi01 short-pass dichroic, 80×50 mm) and emission filter (Semrock Brightline FF01-525/39, ø2"), a custom mechanical part was designed that slips onto the rear, cylindrical section of the tube lens and is held in place by a metal strap clamp such that emission light is reflected off the dichroic beamsplitter towards the camera. A custom kinematic mount was designed that holds the microlens array (MLA, RPC Photonics MLA-S100-f12, square grid, pitch 100 µm, f=1.2 mm, F-number 12.5, diced to 42×42 mm) and is mounted onto the camera housing. The kinematic mount allows for precise adjustment of the tip/tilt angle, the translation along the optical axis, and the rotation around the optical axis via four fine adjustment screws. The microlens array is aligned with respect to the camera by illuminating it with a 40-mm-diameter collimated green laser beam and adjusting the aforementioned degrees of freedom until uniform and focused spots can be observed behind all microlenses. Rotation is adjusted to line up the microlens grid exactly parallel to the camera pixel grid.

The camera (Teledyne DALSA Falcon 4-CLHS 86 M, 86 Megapixels, 6 µm pixel pitch, 12 bit, global shutter, 16 fps full frame rate) is read out via a CameraLink-HS cable and a PCIe frame grabber card (Teledyne DALSA Xtium-CLHS PX8) in the control PC, and image data is streamed to one of two available software-defined RAID-0 arrays of two PCIe flash disks each (2× Samsung 970 EVO 2TB and 2× Sabrent Rocket 2280 4TB, respectively) using a custom data acquisition application written in VisualC#.NET. The magnified image covers an area of ø40 mm on the camera, which corresponds to ~7000×7000 pixels. This subset of pixels can be read out at 18 fps, resulting in a raw data rate of ~1320 MB/s.

The MesoLF illumination path was designed and optimized in Zemax (non-sequential mode) to provide uniform illumination intensity across the full 4-mm FOV. It consists of a mounted blue LED (Thorlabs M470L3, 470 nm center wavelength, 650 mW), an adjustable asphere collimator (Thorlabs SM2F32-A), an iris aperture for adjusting illumination NA, excitation filter (Chroma ET470/40×, ø2"), an engineered diffuser for creating a flat-top intensity profile (RPC Photonics EDC-10-15027-A 2S, 2" square), relay lens (Edmund 45-418, f=300, ø3"), and three-fold mirrors. The relay lens may be positioned at a distance equal to its focal length from the diffuser and the same distance from the illumination-side rear image plane of the tube lens. This arrangement provides telecentric, homogeneous illumination both in the image plane and the focal plane in the sample. We routinely image with an illumination power of ~15 mW post-objective, which corresponds to a power density of ~1.2 mW/mm$^2$ in the sample, a value comparable to our previous LFM imaging methods and typical wide-field imaging.

The as-built wide-field resolution was measured before installing the microlens array and with the camera positioned in the rear image plane of the tube lens by imaging a high-resolution USAF target. On the USAF target, a 20% MTF contrast for group 8-5 is obtained, which corresponds to 406 lp/mm. This measured resolution is lower than the design resolution primarily because in the realized microscope, the bandwidth of the emission filter is 39 nm rather than the 20 nm for which the tube lens achieves diffraction-limited resolution. This wider filter maximizes signal at higher frame rates at a certain expense of resolution. After adding and aligning the MLA and moving the camera-MLA assembly backwards using a precision linear stage such that the MLA was positioned in the rear image plane, the resolution achievable through LFM imaging and reconstruction was characterized. For an USAF target positioned at z=+90 µm from the objective's native focal plane, an MTF contrast of ~50% for group 6-5 was found, which corresponds to 102 lp/mm, thus achieving the design goal of about cell-resolving lateral resolution. To estimate the axial resolution, ø6 µm fluorescent beads were LFM-imaged and their FWHM reconstructed axial extent was taken as a proxy for the resolution. For beads positioned at z=−30 µm relative to the native focal plane, an axial FWHM of ~32 µm is found. The reconstructed lateral FWHM of the 6 µm beads is ~7 µm, compatible with the lateral resolution measurement obtained from imaging an USAF target. As demonstrated in detail in previous publications—the neuron discriminability in the presence of scattering is predominantly determined by the temporal dynamics of neuroactivity, specifically the difference in neuronal activity between neighboring neurons, and to a lesser extent, by optical resolution.

Motion Correction

When imaging in awake, behaving animals, rigid motion correction of functional imaging data is usually necessary, even at small fields of view. At the mesoscopic field of view that MesoLF is capable of capturing, mere rigid motion correction becomes insufficient. At this scale, non-rigid deformations on the scale similar to the size of a neuron are observed.

A variety of methods have been described for correcting brain motion such that it does not disturb the extraction of calcium activity. However, none of these methods are suitable for LFM imaging since they require the ability to shift the acquired raw image laterally. In LFM, the raw image does not directly consist in an image of the sample but requires computational reconstruction to yield an estimate of the sample volume. In the raw image, lateral and angular information contained in the light field emanating from the sample are folded into each other and, in addition, light reaching the sensor is masked by the apertures of the microlenses. In principle, it would be conceivable to reconstruct the individual LFM raw frames one-by-one and then apply existing motion correction, but this would be excessively costly computationally and break the design strategy underlying MesoLF. Methods for excluding motion-affected frames or interpolating neuron activities from specific kernels only approximate the original neuronal activities during motion events.

Figure 6:
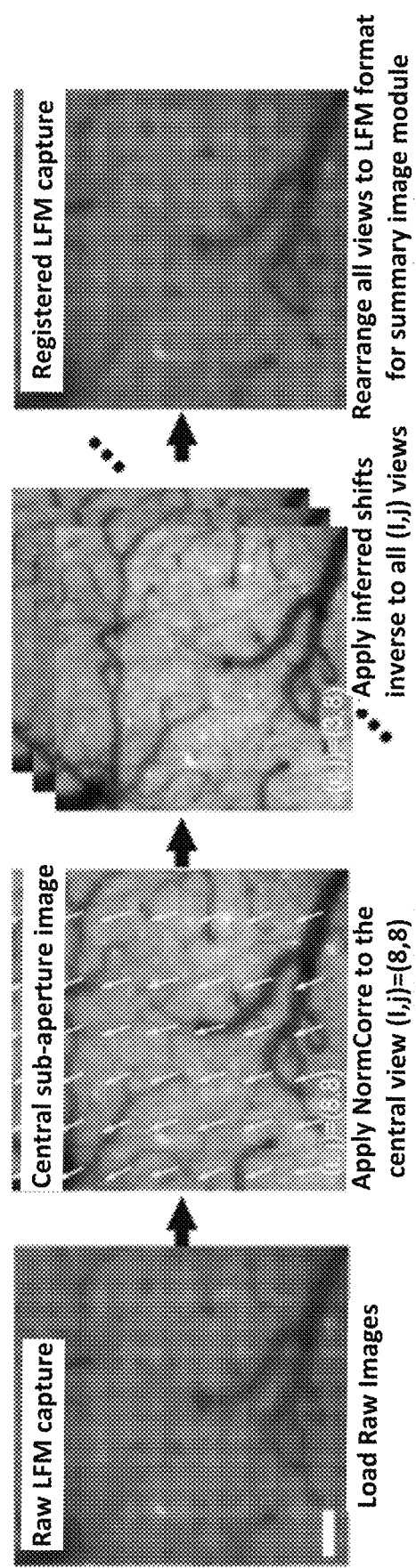
FIG. 6 is a diagram showing an example of a motion correction pipeline that may be used to implement the MesoLF techniques provided herein.

The MesoLF pipeline provides a new method for correcting motion of brain images in an LFM detection geometry without any frame-by-frame reconstructions. This method starts by rearranging the pixels in the raw image into a 2D array of so-called sub-aperture images. A sub-aperture image consists of all the sensor pixels that have the same position relative to their nearest microlens. If there are M×M microlenses and the image formed by each is sampled using N×N sensor pixels, then the raw image (which has dimensions M×M×N×N) can be rearranged into N×N sub-aperture images with dimensions M×M each. Each sub-aperture image corresponds to a perspective view onto the sample from a specific angle. Motion registration may then be performed on the central sub-aperture image, which consists in the central pixel behind each microlens. The FFT-based registration pipeline NoRMCorre may be used in some implementations to obtain the non-rigid motion information, which may then be applied inversely to all the sub-aperture images. Subsequently, the sub-aperture images may be rearranged into the original LFM raw image pixel arrangement as shown in FIG. 6.

To verify the validity of this approach, the correlation matrix between the shift vectors computed individually for each sub-aperture image (i, j) may be plotted: The motion shifts imparted onto the sub-aperture images are all highly correlated with each other, except for those at the edges of the correlation matrix. These sub-aperture images at the edges correspond to angular perspectives from large angles, and hence they do not contain a large amount of information on lateral shifts. The observation that all sub-aperture motion vectors are highly correlated validates our strategy to apply the shifts calculated from the central sub-aperture image to all others.

This approach has several advantages: First, it acts on sub-aperture images which can be built directly from the raw images without prior reconstruction. Second, the sub-aperture images reproduce continuous sample features as continuous image features, compared to the periodically folded structure of LFM data in the raw images. This allows the use of established motion correction algorithms to extract the motion shifts. Third, the lower number of pixels in the sub-aperture image makes the registration almost a hundred times faster compared to using whole raw images. Fourth, complex non-rigid deformation and motion of the brain tissue can be corrected since motion correction is applied individually to small patches of the full field of view.

After motion correction, the correlation between subsequent frames of the central sub-aperture images is increased compared to the raw data. MesoLF corrects the motion of individual smaller patches of the full field of view in parallel. Whereas the motion vectors found within one patch (typically ~700×700 µm as shown in the illustration of the motion correction pipeline in FIG. 6) are only slightly different, the motion vectors seen for different tiles across the full 4-mm FOV differ significantly, which underscores the necessity of non-rigid correction. This assertion is supported further by the observation that in this mesoscale FOV regime, frame-to-frame correlations remain low when using global rigid motion correction only, but improve markedly when correcting different tiles individually, as is done in the MesoLF pipeline.

Summary Image Generation

After background subtraction, motion correction, and filtering, the MesoLF pipeline generates a temporal summary image which is subsequently used to find the initial neuron positions. In this temporal summary image, pixels with strongly varying activity over time stand out, whereas weakly varying or entirely static background is de-emphasized. Simply taking the standard deviation of each pixel along the time axis can achieve such an effect. However, neurons can be surrounded by temporally active neuropil, and light scattering in brain tissue will blur the images of the neuron cell bodies and mix the ballistic cell body images with scattered photons, which may originate from other neurons. Under these conditions, directly taking the standard deviation to generate a summary image results in suboptimal contrast.

To improve the contrast of the temporal summary image, the data is pre-processed in three steps prior to taking the standard deviation: First, pixel-wise high-pass filtering is performed to eliminate slow background. This is achieved by subtracting a low-pass-filtered version of each trace (moving average with large window length) from itself. This may result in a flat baseline, so that after taking the standard deviation along time, the contrast generated by the actual neuronal activity is improved compared to taking the standard deviation without prior high-pass filtering.

As a second preprocessing step, to further distinguish active neurons from high-frequency background noise, a temporal filter may be applied with a small convolutional window size.

To investigate the spread of scattered photons around a ballistic neuron image, Monte Carlo simulations were conducted of two neurons separated axially by 200 µm in brain tissue (Henyey-Greenstein model, scattering length 60-80 µm, anisotropy factor g=0.9). In the raw camera image, scattered photons from the deeper neuron (neuron 1) may add a broad halo around the image of the in-focus neuron (neuron 2), causing a blurred background. To mitigate this effect, a third preprocessing step may be applied in which the raw images are taken to the third power, which increases local contrast and makes in-focus neurons more recognizable. Since the subsequent neuron segmentation relies on local contrast only, this non-linear rescaling does not negatively affect neuron segmentation performance.

Phase-Space Deconvolution With Background Peeling

A key factor in achieving the neuron detection performance in scattering media demonstrated by our approach is our novel MesoLF deconvolution algorithm, which is also referred to as artefact-free phase space reconstruction with background peeling. The provided solution builds on the approach introduced by Lu et al. and is related to techniques used in ptychography to reconstruct an image from projections of the sample along a set of angles.

Before introducing the MesoLF phase space reconstruction algorithm, the conventional Richardson-Lucy LFM reconstruction approach is briefly restated, which may be loosely characterized as operating in "camera pixel space" as opposed to "phase space". The difference will be clarified in what follows.

A. "Pixel-Space" Richardson-Lucy Reconstruction

A common implementation of a light-field microscope consists in a wide-field microscope with a microlens array (MLA) placed in the native imaging plane. The sample space coordinates are denoted as $(x_1, x_2, z)$ and sensor plane coordinates are denoted as $(s_1, s_2)$. The point spread function (PSF) of such an LFM can be written as follows:

$$h(x_1, x_2, z, s_1, s_2) = |\mathcal{F}_{f_\mu}\{U(x_1, x_2, z, s_1, s_2)\Phi(s_1, s_2)\}|^2. \quad (1)$$

Here, $\mathcal{F}_{f_\mu}\{\cdot\}$ denotes the operator in Fresnel approximation that propagates a field by a distance $f_\mu$ along the optical axis. $U(x_1, x_2, z, s_1, s_2)$ is the field in the native image plane generated by a point source at $(x_1, x_2, z)$, given by $$U(x_1, x_2, z, s_1, s_2) =$$
$$\frac{M}{f_{obj}^2 \lambda^2}\exp\left(-\frac{iu}{4\sin^2(\alpha/2)}\right)\int_0^\alpha P(\theta)\exp\left(-\frac{iu\sin^2(\theta/2)}{2\sin^2(\alpha/2)}\right)J_0\left(\frac{\sin(\theta)}{\sin(\alpha)}v\right)\sin(\theta)d\theta, \quad (2)$$

$$v \approx k\sqrt{(x_1-s_1)^2+(x_2-s_2)^2}\sin(\alpha),$$

$$u \approx 4kz\sin^2(\alpha/2),$$

with parameters defined as in Ref. 21.

In Eq. 1, $\Phi(s_1, s_2)$ is the phase shift function describing an MLA, parametrized by microlens pitch d and focal length $f_\mu$ $$\Phi(s_1, s_2) = \int\int rect\left(\frac{t_1}{d}\right)rect\left(\frac{t_2}{d}\right)\exp\left(-\frac{ik}{2f_\mu}(t_1^2+t_2^2)\right). \quad (3)$$
$$comb\left(\frac{s_1-t_1}{d}\right)comb\left(\frac{s_2-t_2}{d}\right)dt_1 dt_2.$$

To reconstruct the 3D sample from the captured image, the continuous sample and sensor space is discretized. LFM can then be modelled as a linear system H which maps the 3D sample space onto 2D sensor space:

$$\sum_{x_1,x_2,z} H(x_1, x_2, z, s_1, s_2)X(x_1, x_2, z) = Y(s_1, s_2). \quad (4)$$

Here, Y is the discrete sensor image and X is the 3D brightness distribution of the sample. The weight matrix H can be computed from Eq. 1, which describes how photons emitted from the voxel $(x_1, x_2, z)$ contribute to the signal received at pixel $(s_1, s_2)$. The weight matrix H can be simplified by exploiting the translational periodicity of the MLA, which implies $$H(x_1, x_2, z, s_1, s_2) = H(x_1+D, x_2+D, z, s_1+D, s_2+D), \quad (5)$$

where D is the pitch of microlens array in units of the sensor pixel pitch. Note that the sample coordinates $(x_1, x_2)$ can be rewritten as $$x_1 := (m_1-1)D + u_1,$$
$$x_2 := (m_1-1)D + u_1. \quad (6)$$

The system response from the sample area in front of the central microlens is denoted with coordinates $(m_{10}, m_{20})$, projected in the sample space as $$H_{FOR}(u_1, u_2, z, s_1, s_2) := H((m_{10}-1)D+u_1, (m_{20}-1)D+u_2, z, s_1, s_2), \quad (7)$$

The overall forward projection matrix H from sample to sensor can then be written as $$H(x_1, x_2, z, s_1, s_2) := H_{FOR}(u_1, u_2, z, s_1-(m_1-m_{10})D, s_2-(m_2-m_{20})D). \quad (8)$$

Correspondingly, the forward model can be written as $$Y(s_1, s_2) = \sum_z \sum_{u_1,u_2} \sum_{m_1,m_2} H_{FOR}(u_1, u_2, z, s_1-(m_1-m_{10})D, s_2- \quad (9)$$
$$(m_2-m_{20})D)X(m_1, u_1, m_2, u_2, z).$$

For simplicity, the notation $H_{for}(X)=Y$ is used to represent the forward projection in LFM defined by Eq. 9.

Similarly, for backward projection from the sensor to the sample, the new coordinates n and v are introduced:

$$s_1 := (n_1-1)D + v_1$$
$$s_2 := (n_2-1)D + v_2 \quad (10)$$

The inverse response of the sensor area behind the central microlens $(n_{10}, n_{20})$ in sensor space can then be written as $$H_{BACK}(x_1, x_2, z, v_1, v_2) := H(x_1, x_2, z, (n_{10}-1)D+v_1, (m_{20}-1)D+v_2) \quad (11)$$

The transmission matrix H can then be represented using $H_{BACK}$ as $$H(x_1, x_2, z, s_1, s_2) = H_{BACK}(x_1-(n_1-n_{10})D, x_2-(n_2-n_{20})D, z, v_1, v_2) \quad (12)$$

Thus, the backward model is $$X(x_1, x_2, z) = \sum_{v_1,v_2} \sum_{n_1,n_2} H_{BACK}(x_1 - (n_1 - n_{10})D, x_2 - \quad (13)$$
$$(n_2 - n_{20})D, z, v_1, v_2) Y(n_1, v_1, n_2, v_2)$$

which may be written as a shorthand using the notation $H_{back}(Y)=X$. It is common to use the well-known Richardson-Lucy (RL) algorithm to iteratively update X from Y and H. In each iteration, RL computes the new estimate $\hat{X}^{(t)}$ from the result of the previous iteration, $\hat{X}^{(t-1)}$, via $$\hat{X}^{(t)} \leftarrow \hat{X}^{(t-1)} \odot H_{back}\left(\frac{Y}{H_{for}(\hat{X}^{(t-1)})}\right), \quad (14)$$

where $\odot$ denotes element-wise multiplication.

B. Phase Space Deconvolution

Before introducing the innovations in the MesoLF reconstruction algorithm, it is necessary to outline the phase space reconstruction technique proposed by Lu et al. The start by expanding $H_{FOR}$ into the sensor plane coordinates that are based on the periodicity of microlens array.

$$H_{FOR}(u_1, u_2, z, n_1, v_1, n_2, v_2) = H((m_{10}-1)D + u_1, \\ (m_{20}-1)D + u_1, z, (n_1-1)D + v_1, (n_2-1)D + v_2) \quad (15)$$

Similarly, by denoting $Y_{v_1,v_2}(n_1, n_2)$ as $Y ((n_1-1)D+v_1, (n_2-1)D+v_2)$, the LFM forward projection operation can be written as $$Y_{v_1,v_2}(n_1, n_2) = \quad (16)$$
$$\sum_z \sum_{u_1,u_2} \sum_{m_1,m_2} H_{FOR}(u_1, u_2, z, n_1 - (m_1 - m_{10}), v_1, n_2 - \\ (m_2 - m_{20}), v_2) X(m_1, u_1, m_2, u_2, z)$$

Here $Y_{v_1,v_2}(n_1, n_2)$ is called the phase space response of LFM under the phase space coordinate $(v_1, v_2)$. For simplicity, we denote $$H_{PFOR,v_1,v_2,z}(u_1, u_2, n_1, n_2) = H_{FOR}(-u_1, u_2, z, n_1, v_1, \\ n_2, v_2) \quad (17)$$

and $$X_z(u_1, u_2, m_1, m_2) = X(m_1, u_1, m_2, u_2, z). \quad (18)$$

Then, $$Y_{v_1,v_2}(n_1, n_2) = \sum_z \sum_{u_1,u_2} \sum_{m_1,m_2} H_{PFOR,v_1,v_2}(0 - u_1, 0 - u_2, n_1 - \quad (19)$$
$$(m_1 - m_{10}), n_2 - (m_2 - m_{20}), z) X_z(u_1, u_2, m_1, m_2) = \\ \sum_z (H_{PFOR,v_1,v_2} * X_z)|_{(0,0,:,:)}$$

Here, $*$ denotes convolution between $(u_1, u_2)$ and $(m_1, m_2)$. Note that the convolution between $H_{PFOR,v_1,v_2}$ and $X_z$ results in a 4D array, so a 2D slice needs to be selected from the 4D array to match the dimension of $Y_{v_1,v_2}(n_1, n_2)$.

For backward projection, recall that the traditional LFM backward projection is (Eq. 13):

$$X(x_1, x_2, z) = \quad (20)$$
$$\sum_{v_1,v_2} \sum_{n_1,n_2} H_{BACK,v_1,v_2}(x_1 - (n_1 - n_{10})D, x_2 - (n_2 - n_{20})D, z)$$
$$Y_{v_1,v_2}(n_1, n_2)$$

This formulation already uses what the sensor data in phase space representation $Y_{v_1,v_2}(n_1, n_2)$, thus the LFM backward projection in phase space simply remains the same as in the "pixel space" formulation:

$$X_{v_1,v_2}(x_1, x_2, z) = \quad (21)$$
$$\sum_{n_1,n_2} H_{BACK,v_1,v_2}(x_1 - (n_1 - n_{10})D, x_2 - (n_2 - n_{20})D, z) Y_{v_1,v_2}(n_1, n_2)$$

For simplicity, let us write the phase space forward projection operation as $H_{FOR}^{v_1,v_2}(\bullet)$, and the backward propagation as $H_{BACK}^{v_1,v_2}(\bullet)$. With an initialization value for the sample space estimate $X_{init}$ and a captured image Y, the phase space LFM reconstruction algorithm is $$\hat{X}^{(t)} \leftarrow \hat{X}^{(t-1)} + \alpha_{t-1} \hat{X}^{(t-1)} \odot H_{BACK}^{v_1,v_2}\left(\frac{Y}{H_{FOR}^{v_1,v_2}(\hat{X}^{(t-1)})}\right). \quad (22)$$

The update rule Eq. 22 runs over all phase space coordinates $(v_1, v_2)$. The advantage of phase space reconstruction comes from the freedom to choose the order of updating the $(v_1, v_2)$ slices. By choosing to update first those slices that correspond to high spatial frequencies, the reconstruction can be accelerated compared to pixel-space.

C. MesoLF Artefact-Free Phrase Space Reconstruction (Without Peeling)

The phase space update rule given in Eq. 22 is computationally more efficient than the established "pixel-space" Richardson-Lucy approach but still suffers from similar reconstruction artifacts, which originate from aliasing due to the depth-dependent sampling density in sample space in an LFM geometry. In the provided MesoLF reconstruction approach, phase space reconstruction is combined with the use of different filters for different depth slices of the sample volume. Specifically, following each update step, the slice at depth z of the sample space estimate is convolved with a Gaussian filter. The FWHM $\omega(z)$ of the filter is given by $$\omega(z) = \min\left(\left|\frac{d_{sens}^{mla}}{d_{tl}^{mla}}\right|\left|\frac{z''}{d_{tl}^{mla} - z''}\right|\left|D - \frac{D}{2z'''|z''' - d_{sens}^{mla}|}\right|, \frac{D}{2}\right), \quad (23)$$

with $z'' = M^2(z - f_{obj}) + d_{tl}^{mla}$, $$z''' = \frac{d_{sens}^{mla}(d_{tl}^{mla} - z'')}{d_{tl}^{mla} - z'' - d_{sens}^{mla}}$$

Here, $d_{sens}^{mla}$ is the distance between the MLA and the sensor, $d_{tl}^{mla}$ is the distance between tubelens and MLA. $\omega(z)$ reaches its maximal size in the native image plane to mitigate the large square-shaped artefacts that otherwise appear there. ω(z) decreases with increasing distance from the native image plane. The full MesoLF artefact-free reconstruction algorithm (without peeling) is listed as pseudocode in FIG. 7.

D. MesoLF Artefact-Free Phrase Space Reconstruction With Background Peeling

In one-photon imaging, it is very difficult to confine the axial extent of the illumination. This has the consequence that tissue above and below the depth range targeted for LFM reconstruction will also be excited and emit fluorescence. Such out-of-range signals mix with in-range signals, which degrades the reconstruction contrast and reduces the signal-to-background ratio. Furthermore, blood vessels in superficial tissue layers expand and contract periodically and thus generate a temporally modulated shadowing effect for fluorescence emanating from further below. While blood vessels also absorb at the excitation wavelength, it is expected that the effect of excitation shadowing to be partially compensated by scattering and ultimately diffusion of illumination light, so that excitation shadowing effects are much less pronounced than emission shadowing. These temporal modulations of emission intensity at blood vessel boundaries manifest themselves in the temporal activity summary images that are generated during MesoLF processing. If left untreated, these spurious activity signals would lead to false neuron candidates because some sections of these vasculature-induced activity patterns would appear in the output of a naïve segmentation algorithm as neuron-like segments. To solve this problem, a technique which referred to herein as "background peeling" has been developed and which can more faithfully extract true signals from background-contaminated data by iteratively reconstructing and removing out-of-range signals.

This approach starts by explicitly including out-of-range regions above and below the targeted reconstruction range into the LFM forward model:

$$Y = HX + H^A X^A + H^B X^B = [H^A, H, H^B][X^A; X; X^B] \quad (24)$$

where H is the forward projection matrix for the target depth range, $X^A$, $X^B$ are the defocused out-of-range volumes above and below the target range, and $H^A$, $H^B$ are the forward projection matrices for these two volumes. The depth range of $X^A$, X, and $X^B$ is denoted as $1, \ldots, d_T, d_{T+S}$, and $d_{T+S+1}, \ldots d_{T+S+B}$. The difficulty in solving this problem stems from the unknown $X^A$, $X^B$, and the unknown range of $H^A$, $H^B$. These large uncertainties render potential solutions to Eq. 24 non-unique.

To approach this challenge, a ballistic PSF H' is used with a larger z depth range to perform reconstruction, i.e., col (H')>col(H) where col(•) returns the column number. The extended PSF H' serves as an approximation to the true underlying $[H^A, H, H^B]$, which is the true forward projection matrix of the imaging system in the presence of scattering but remains unknown. After reconstruction, only depths $d_{T+1}, \ldots, d_{T+S}$ are retained as the reconstruction of the target depth range. Reconstruction with such an extended PSF will remove some of the background from out-of-range layers.

On the other hand, since the scalar products $\langle H_i, H_j \rangle \neq 0$, $\langle H_i^A, H_j \rangle \neq 0$, and $\langle H_i^B, H_j \rangle \neq 0$, reconstructions for depth layer i will exhibit crosstalk with the other layers j. In other words, even after the volumes above and below the target range have been removed from the extended-depth PSF reconstruction, they will still have effects on the retained depth layers. Besides, the top and bottom volumes $X^A$ and $X^B$ are often much brighter than the target volume X due to the periodic dilation of the blood vessels and large defocused bottom volume. Therefore, their shadows disturb the reconstructions even with extended PSF reconstruction. Thus a "background peeling" technique was developed that removes the forward-projection of the top and bottom layers of X from the sensor plane data after the first reconstruction iteration to further reduce crosstalk. The brightest structures in the top and bottom layers will iteratively be removed so that they do not interfere with structures from other depths. A pseudocode listing of MesoLF background peeling technique is shown in FIG. 8.

Morphological Segmentation

To motivate our design of the MesoLF neuron segmentation technique, two established segmentation approaches are first introduced and subsequently introduce a novel segmentation approach provided herein, followed by a comparison.

A. 3D Segmentation in CNMF-E

The widely used CNMF-E package uses a segmentation approach that is based on convolving a 3D neuron template with the data volume to find candidate neuron positions. While only a crude approximation to the ideal shape of the volumetric image of a neuron, the comparatively low numerical aperture of detection and the scattering nature of sample in the present case justify the use of a simple 3D Gaussian to model the reconstructed shape of a neuron:

$$d = e^{-\frac{x^2 + y^2 + \alpha z^2}{\sigma_1^2}} \quad (25)$$

Here, σ is the expected neuron radius and α is the aspect ratio of the PSF (lateral FWHM over axial FWHM). The first candidate neuron position (i, j, k) is then found by convolving d with the data volume $I_S$ and finding the brightest pixel in the resulting volume:

$$\max_{(i,j,k)} I_s * d \quad (26)$$

The 3D shape $$d_p = I_S(i, j, k) e^{-\frac{(x-i)^2 + (y-j)^2 + (z-k)^3}{\sigma_1^2}}$$

is then considered the first neuron candidate, where p is the candidate index. The shape is subtracted from the data volume, and Eq. 26 is re-evaluated (greedy search). This segmentation method is schematically illustrated in FIG. 9, upper box.

B. Direct 3D Segmentation

In reconstructed LFM data, in contrast to two-photon data, some structures in the temporal summary image may have high brightness values but do not correspond to neurons, for example fragments of blood vessels that appear active due to their periodic pulsation. To mitigate this, the CNMF approach is extended by additionally constructing a Gaussian ring template that represents the dark region immediately surrounding a neuron:

$$d_S = e^{-\frac{x^2+y^2+\alpha z^2}{\sigma_2^2}} - e^{-\frac{x^2+y^2+\alpha z^2}{\sigma_1^2}} \quad (27)$$

Here, $\sigma_2 > \sigma_1$ is the expected radius of the surrounding region. Both d and $d_S$ are convolved with the reconstructed summary volume $I_S$, and find the pixel (i, j) which maximizes $$\max_{(i,j)} \frac{I_S * d \mid (i, j, k)}{I_S * d_S \mid (i, j, k)}. \quad (28)$$

The shape $$d_p = I_S(i, j) e^{-\frac{(x-i)^2+(y-j)^2+(z-k)^3}{\sigma_1^2}}$$

is constructed as the first neuron candidate, where p is the candidate index. Next, $I_S$ is updated by subtracting $d_k$, and re-evaluate Eq. 28 to find the next candidate (greedy search).

Despite this core-shell template design, our simulations show that this direct 3D segmentation procedure is not robust enough when it comes to differentiating neurons whose reconstructed volumetric images overlap axially. This is because in such cases these two volumetric images may lead to a misleading brightness peak in the overlap region.

C. 2D Segmentations With Clustering

To improve segmentation stability, plane-by-plane 2D segmentation is performed by clustering across planes (FIG. 9C, lower-right box). To this end, it is assumed the target neuron shape to be a 2D Gaussian, $$d = e^{-\frac{x^2+y^2}{\sigma_1^2}} \quad (29)$$

where $\sigma_1$ is expected neuron radius. In addition, a 2D Gaussian ring shape is constructed to represents the dark region surrounding a neuron:

$$d_S = e^{-\frac{x^2+y^2}{\sigma_2^2}} - e^{-\frac{x^2+y^2}{\sigma_1^2}}, \quad (30)$$

where $\sigma_2 > \sigma_1$ is the radius of the surrounding region. Both d and $d_S$ are convolved with a given slice $I_S$ of the reconstructed summary volume, and find the pixel (i, j) which maximizes $$\max_{(i,j)} \frac{I_S * d \mid (i, j)}{I_S * d_S \mid (i, j)}. \quad (31)$$

Then, the shape $$d_k = I_S(i, j) e^{-\frac{(x-i)^2+(y-j)^2}{\sigma_1^2}}$$

is considered the first neuron candidate, where k is the candidate index. $I_S$ is then updated by subtracting $d_k$, and re-evaluate Eq. 31 (greedy search). Subsequently, an ellipse is fitted to the resulting segment and reject candidates not approximated well by an ellipse with aspect ratio <5. This approach allows to robustly reject segments resulting from undesired structures, such as blood vessels.

After plane-wise segmentation, the 2D segments are clustered and merged based on spatial proximity in 3D. The center of merged patches in 3D space is taken as the brightness-weighted center of the voxels in the patch. After merging, a 3D footprint is computed for each of the resulting neuron candidates in the volume, which are used subsequently in the main demixing step of the MesoLF pipeline.

D. Comparison of Segmentation Approaches

To evaluate the performance of the provided segmentation method, it is compared with a ground truth and a CNMF-E segmentation result as follows: In a single plane from a phase space reconstruction of an LFM raw frame (experimental data from GECI-labelled mouse cortex at a depth of 100 μm), all neurons are manually encircled with ellipses and use the resulting segmentation as the ground truth (FIG. 9A). The MesoLF segmentation method and the CNMF-E segmentation method are run, and the results are compared with ground truth.

As quantified by the well-known precision, sensitivity, and F-scores, our method detects more neurons while missing or incorrectly segmenting fewer (FIG. 9B). At the same time, the CNMF-E segmentation method fails to detect neurons that are much dimmer than others and tends to severely over-segment large and bright components. Even though it would be possible to merge some of the over-segmented components later based on their temporal activities, this is undesirable in the context of MesoLF due to the computational overhead incurred by processing superfluous segments.

Figure 9D:
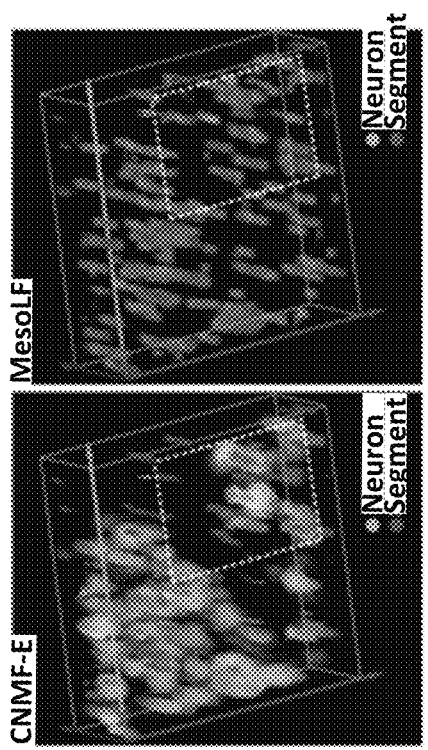
FIG. 9D is diagram showing an example 3D rendering of segmentation results from CNMF-E (left) and MesoLF (right).
Figure 9E:
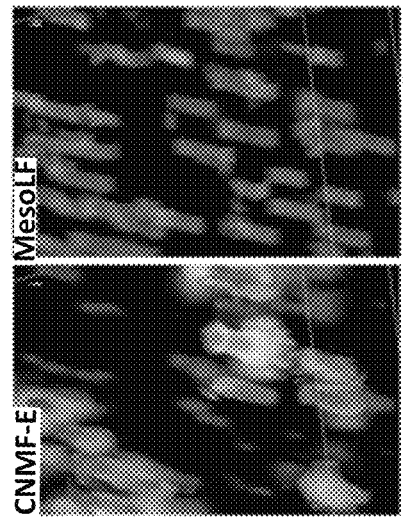
FIG. 9E is a diagram showing a zoomed in view of the areas indicated by the dashed lines in FIG. 9D.

In a similar manner, we also compared our segmentation method with CNMF-E applied to a 3D dataset. We numerically synthesized a 3D cortical volume of 600×600×200 μm³ with scattering parameters chosen to be comparable to experimental data (FIG. 9C, left side). A rendering of the 3D segments obtained from CNMF-E and our MesoLF segmentation approach is shown in comparison to the background-free neuronal volume in FIG. 9D: CNMF-E results in blurred segments and misses many of the dimmer neurons. The techniques provided herein uniformly segment both bright and dim neurons, as further highlighted in the zoomed-in views in Supplementary FIG. 9E.

Figure 9F:
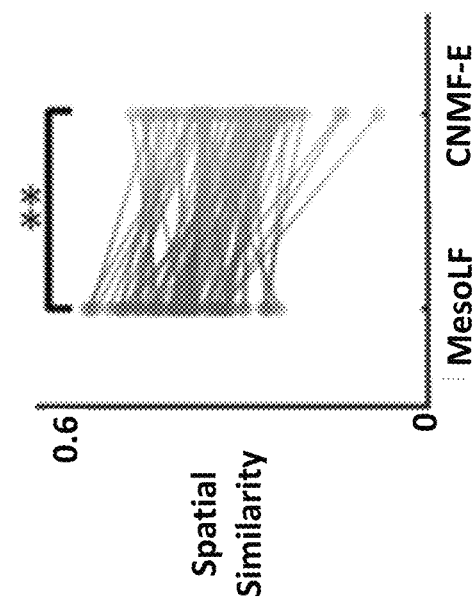
FIG. 9F is a diagram providing an example comparison of the spatial similarity index of neurons paired between ground truth and CNMF-E versus MesoLF.
Figure 9G:
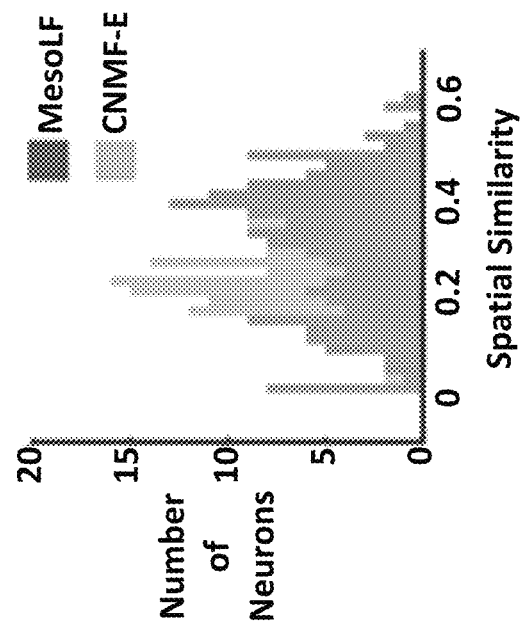
FIG. 9G is a histogram of spatial similarity indices of segmented neurons compared to ground truth by CNMF-E versus MesoLF.

To quantitatively compare segmentation performance for our method in comparison to CNMF-E, we plot the spatial similarity index SSIM of the segments produced by both methods against ground truth in FIG. 9F. The techniques provided herein result in a significantly larger set of similarity indices than CNMF-E. FIG. 9G shows histograms of the similarity indices produced by both methods, further demonstrating the improvement achieved by the techniques provided herein.

Demixing and Background Rejection

Temporal traces extracted from LFM data are prone to be contaminated by signals arising from surrounding neuropil (dendrites and axons). This is because scattering spreads fluorescence photons originating from neuropil into the image of the soma, causing uneven baselines and crosstalk. The MesoLF pipeline explicitly takes neuropil contamination into account and provides a robust tool to reject these background components and restore low-crosstalk soma signal traces. The neuropil in the immediate vicinity of a neuron soma is modeled as a spherical shell with an outer diameter that is approximately twice the inner diameter, which is chosen to match a typical neuron size. Both the neuron and neuropil footprints are computed as they would appear on the LFM sensor before the main demixing procedure and use non-negative matrix factorization with sparsity regularization to demix the neuron and shell components at the same time. The addition of neuropil "shell" footprints into the main non-negative demixing already reduces neuropil contaminations from the neuron traces, but not completely so. The resulting neuron traces still exhibit uneven baselines. Therefore, an additional optimization step has been introduced after the main NMF demixing to solve the following problem, which was first proposed for 2 pM data:

$$\min_{c_i,s_i} \|F_i - s_i * k_i - c_i N_i\|_2^2 + \lambda \|s_i\|_0,$$

where $F_i$ is the activity trace from i-th neuron soma, $N_i$ is the trace from the neuropil region surrounding the i-th neuron, $s_i$ is a binary time series containing the underlying action potential events and $k_i$ is the GECI response kernel to an action potential. The coefficients $c_i$ are introduced to allow matching the amplitude of neuron and neuropil traces. The above non-convex optimization problem attempts to obtain minimal loss by finding the correct $s_i$ and $c_i$. In contrast to the solution strategy proposed in Ref. 9, a greedy search is used in $c_i$ with a step size of 0.01 and allow values ranging from 0 to 1.5, which performs more robustly and efficiently in the MesoLF context. The final output is the cleaned-up neuron trace given by $F_i - c_i N_i$.

Applying this background rejection method results in traces exhibiting fast increase and slow decrease features as would be expected from the known properties of the GECI response kernel. Most false calcium peaks that result from neuropil crosstalk are eliminated. The Pearson correlation coefficients are compared between all pairs of neuron traces found in a slice at 300 μm depth, with and without our background rejection enabled. With background removal enabled, the cross-correlation values markedly decrease.

Blood Vessel Rejection

As mentioned in several of the preceding sections, the temporal modulation in emission brightness caused by the periodic expansions and contractions of blood vessels must be carefully mitigated to avoid its false identification as neuronal activity. This is done at several stages throughout the MesoLF pipeline, which is summarized in this section.

First, during preprocessing and summary image generation, the time series of each pixel in the raw camera movie are temporally filtered to exclude brightness variations that are too slow to be compatible with GECI activity.

Second, after summary image reconstruction, the B-COSFIRE filter is applied to highlight blood vessels for subsequent thresholding and masking. For each depth of the reconstructed volume, B-COSFIRE applies a Gaussian filter and a set of shifted Difference-of-Gaussian filters. After a local maximum operation and weighted summation, the output image generated by the filter only contains emphasized versions of the tube-like, elongated shapes associated with blood vessels. B-COSFIRE was chosen due to its robustness, high degree of automatization, and reliance of only four parameters for effective operation. Thresholding the B-COSFIRE output results in blood vessel masks. The blood vessels are then excluded from raw reconstructions so that they will not be segmented as neurons.

Third, as mentioned above, after performing segmentation, segments are fitted with ellipses and exclude those with an aspect ratio above a threshold.

Finally, any residual vessel-induced temporal signals and associated neuron candidates are rejected during the neuron candidate classification stage using supervised machine learning (see below).

Candidate Classification Using Supervised Machine Learning

Despite several filtering and demixing stages throughout the MesoLF pipeline, after the final demixing step, a minor fraction of neuron candidate traces may still exhibit features incompatible with GECI activity or are otherwise of low quality (low SNR). Therefore, after subtracting the neuropil background from the neuron candidates traces as described in the preceding examples, traces are classified based on their temporal shape and noise level. All temporal traces are assigned to one of three categories: traces with low noise and few artifacts (high quality), traces with some noise and artifacts (low quality), and traces with high noise and large artifacts (false positives). To accommodate experimenter preferences, two pre-trained classifiers have been provided, one optimized to be "sensitive", i.e., to keep traces with both high and low quality, and one optimized to be "conservative", i.e., to keep only traces with high quality scores.

To facilitate supervised training of the classifiers, 5,454 traces were manually labeled using a custom GUI tool that allows high-throughput trace annotation in an interactive manner. This annotated dataset was used to train a neural network with 5 convolutional (CONV) layers and 3 fully connected (FULL) layers. The input of the network is a vector with 6,000 elements representing the calcium dynamics, downsampled to 6 Hz (for GCaMP6s). The neural network in this example implementation as trained with the Deep Learning Toolbox in MATLAB R2020a with the built-in Adam optimizer for 100 epochs. A customized function was used to monitor the training process and stop the training when accuracy did not improve anymore. For comparison, a support vector machine (SVM) was also trained. Both models were tested on held-out test data. The test dataset was designed to be balanced, i.e., to contain the same number of traces for each of the classes. In both sensitive and conservative modes, the proposed neural network approach outperforms the SVM model, both in terms of precision, sensitivity, and F1 scores. In conservative mode, in which only high-quality traces are kept, both approaches have very high precision and relatively low sensitivity. This indicates that all kept traces actually have high quality while some actual high-quality traces are falsely rejected. This is because the distinction between high- and low-quality traces is not as well-defined as the distinction between true positive and false positive (non-neuron) traces. In sensitive mode, the neural network achieves precision, sensitivity, and F1 scores exceeding 0.9, indicating good performance. Sensitive mode is recommended as the default in most applications. In cases where only high-SNR traces are of relevance, the conservative approach may be more appropriate.

Figure 10:
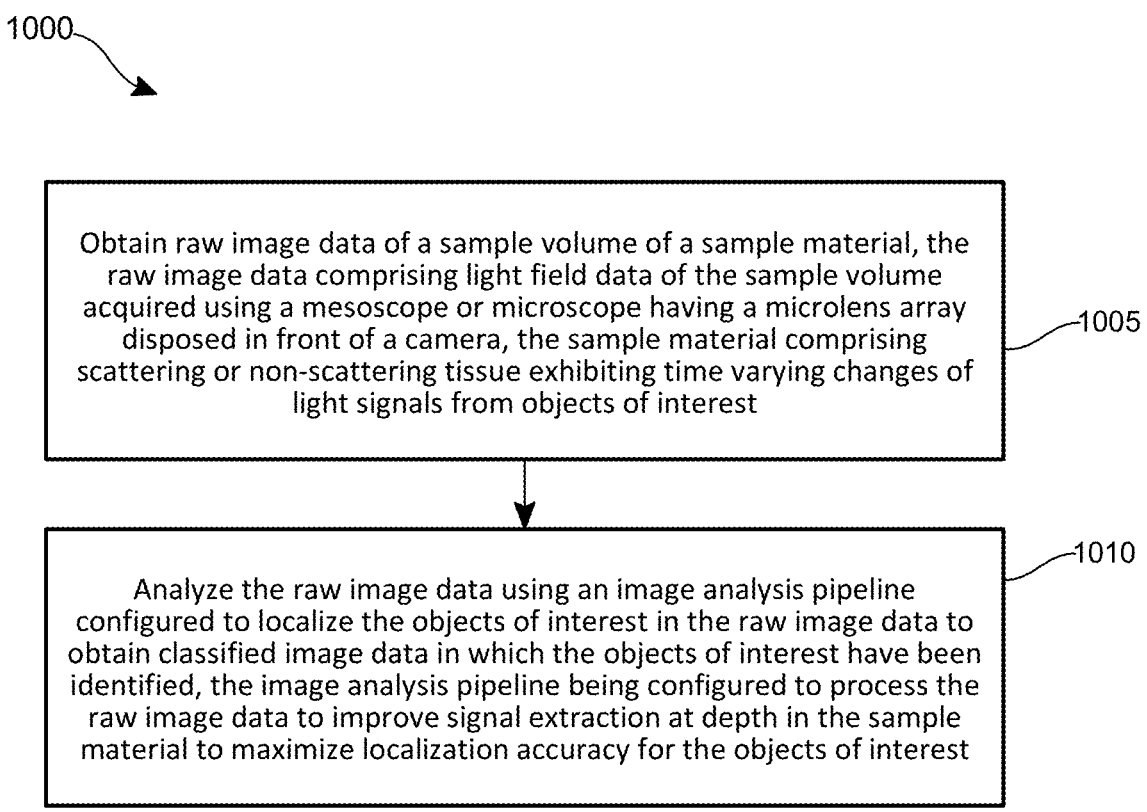
FIG. 10 is a flow diagram of an example process for volumetric imaging.

FIG. 10 is a flow chart of an example process 1000 for volumetric imaging. The process 1000 may be implemented by the MesoLF computational pipeline 200 described in the preceding examples.

The process 1000 may include an operation 1005 of obtaining raw image data of a sample volume of a sample material. The raw image data may include light field data of the sample volume acquired using a mesoscope or microscope having a microlens array disposed in front of a camera as discussed in the preceding examples. The sample material may be scattering or non-scattering materials exhibiting time varying changes of light signals from objects of interest. The sample material may fluoresce as discussed in the preceding examples. The raw image data may be obtained from the MesoLF optical components 205, which may be implemented by the MesoLF optical path 100. The raw data is acquired with the microlens array being disposed in the rear image plane of the mesoscope or microscope and the camera is disposed in the focal plane of the microlenses.

The process 1000 may include an operation 1010 of analyzing the raw image data using an image analysis pipeline configured to localize the objects of interest in the raw image data to obtain classified image data in which the objects of interest have been identified. The image analysis pipeline is configured to process the raw image data to improve signal extraction at depth in the scattering material to maximize localization accuracy. The image analysis pipeline may be implemented by the MesoLF computational pipeline 200 shown in the preceding examples. The MesoLF computational pipeline 200 may perform various operations on the raw image data to improve the signal extraction and to maximize the location accuracy of the objects of interest in the sample volume. These operations may include motion correction, making vasculature and/or vasculature pulsation, rejection of fluorescence background from above and/or below the sample volume, morphological segmentation of candidate objects of interest and their associated shells, spatio-temporal demixing, local demixing (such as but not limited to soma-neuropil demixing), and classification of activity traces. Some implementations may include a subset of these operations and/or may include additional operations instead of or in addition to one or more of these operations.

The classified image data may be classified using one or more machine learning models configured to identify the candidate objects of interest. While many of the preceding examples describe the objects of interest as neuron traces, the techniques provided herein are not limited to scanning brain tissue and other types of objects of interest may be identified in other types of samples.

Figure 11:
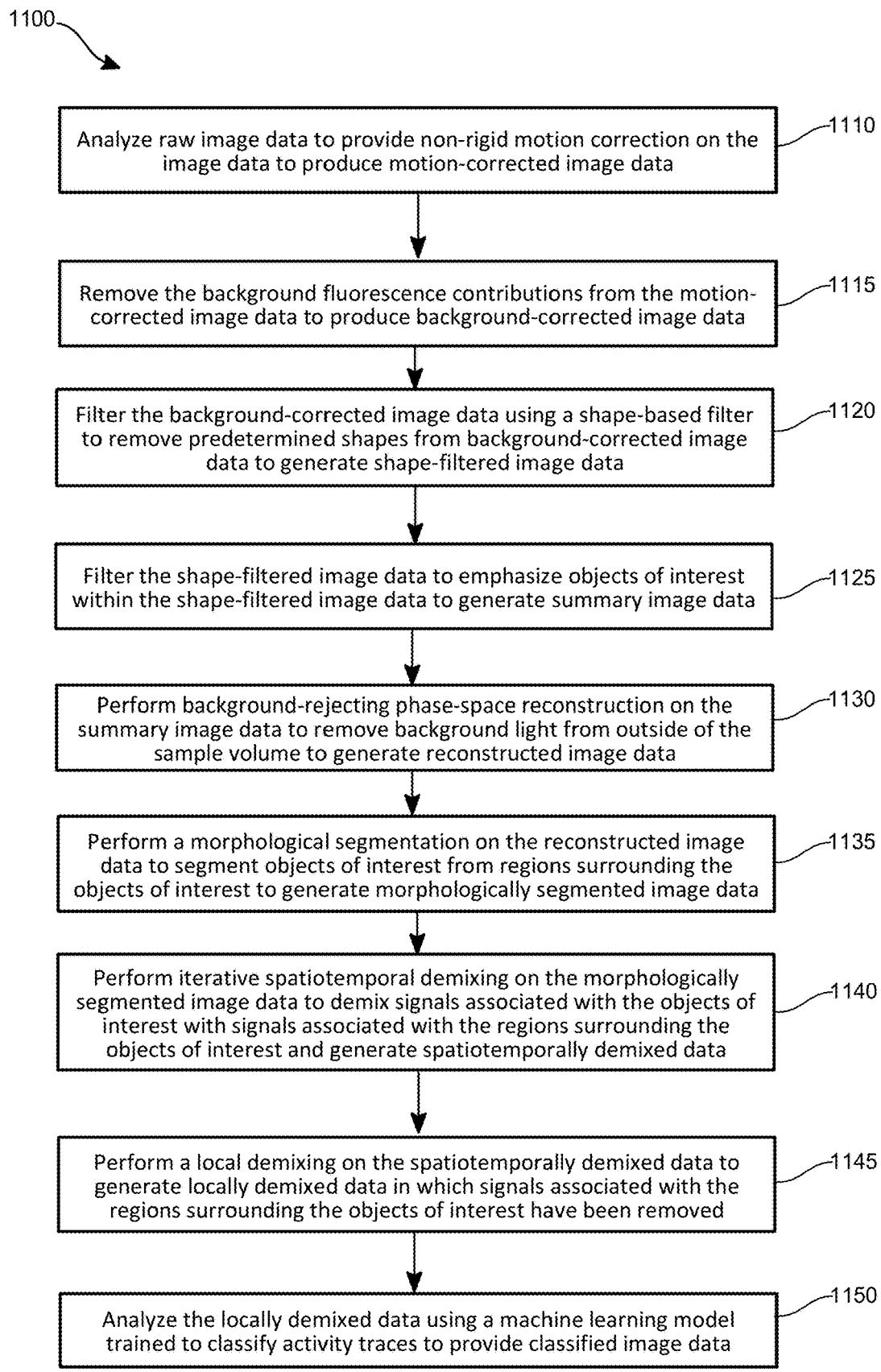
FIG. 11 is a flow diagram of an example process for image analysis.

FIG. 11 is a flow chart of an example process 1100 for image analysis. The process 1000 may be implemented by the MesoLF computational pipeline 200 described in the preceding examples. The process 1100 may be used to implement, at least in part, the operation 1010 of the process 1000 shown in FIG. 10. In some implementations, the process 1100 may include fewer operations than shown in FIG. 11 and/or other options not shown in FIG. 11. Furthermore, in some implementations, the process 1100 may be implemented separately from the process shown in FIG. 10 and may be used to analyze light field data collected from a sample value of scattering or non-scattering sample material.

The process 1100 may include an operation 1110 of analyzing raw image data to provide non-rigid motion correction on the image data to produce motion-corrected image data. The raw image data may be obtained from the MesoLF optical components 205, which may be implemented by the MesoLF optical path 100. The non-rigid motion correction unit 215 may be used to implement the non-rigid motion correction as discussed in the preceding examples.

The process 1100 may include an operation 1115 of removing the background fluorescence contributions from the motion-corrected image data to produce background-corrected image data. The operation 1115 may be implemented by the global background subtraction unit 220 as discussed in the preceding examples.

The process 1100 may include an operation 1120 of filtering the background-corrected image data using a shape-based filter to remove predetermined shapes from background-corrected image data to generate shape-filtered image data. The operation 1120 may be implemented by the shape-based vasculature filter unit 225 as discussed in the preceding examples.

The process 1100 may include an operation 1125 of filtering the shape-filtered image data to emphasize objects of interest within the shape-filtered image data to generate summary image data. The operation 1125 may be implemented by the filtered activity summary image unit 230 as discussed in the preceding examples.

The process 1100 may include an operation 1130 of performing background-rejecting phase-space reconstruction on the summary image data to remove background light from outside of the sample volume to generate reconstructed image data. The operation 1130 may be implemented by the background-rejecting phase-space reconstruction unit 235 as discussed in the preceding examples.

The process 1100 may include an operation 1135 of performing a morphological segmentation on the reconstructed image data to segment objects of interest from regions surrounding the objects of interest to generate morphologically segmented image data. The operation 1135 may be implemented by the morphological segmentation unit 240 as discussed in the preceding examples.

The process 1100 may include an operation 1140 of performing iterative spatiotemporal demixing on the morphologically segmented image data to demix signals associated with the objects of interest with signals associated with the regions surrounding the objects of interest and generate spatiotemporally demixed data. The operation 1140 may be implemented by the spatial-temporal demixing unit 245 as discussed in the preceding examples.

The process 1100 may include an operation 1145 of performing a local demixing on the spatiotemporally demixed data to generate locally demixed data in which signals associated with the regions surrounding the objects of interest have been removed. The operation 1145 may be implemented by the local soma-neuropil demixing unit 250 as discussed in the preceding examples.

The process 1100 may include an operation 1150 of analyzing the locally demixed data using a machine learning model trained to classify activity traces to provide classified image data. The operation 1150 may be implemented by the classification of activity traces unit 260. The classified image data includes classifications of neuron candidate traces.

The detailed examples of systems, devices, and techniques described in connection with FIGS. 1-3T and 6-11 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-3T and 6-11 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

FIG. 4 is a block diagram 400 illustrating an example software architecture 402, various portions of which may be used in conjunction with various hardware architectures herein described, which may implement any of the above-described features. FIG. 4 is a non-limiting example of a software architecture, and it will be appreciated that many other architectures may be implemented to facilitate the functionality described herein. The software architecture 402 may execute on hardware such as a machine 500 of FIG. 5 that includes, among other things, processors 510, memory 530, and input/output (I/O) components 550. A representative hardware layer 404 is illustrated and can represent, for example, the machine 500 of FIG. 5. The representative hardware layer 404 includes a processing unit 406 and associated executable instructions 408. The executable instructions 408 represent executable instructions of the software architecture 402, including implementation of the methods, modules and so forth described herein. The hardware layer 404 also includes a memory/storage 410, which also includes the executable instructions 408 and accompanying data. The hardware layer 404 may also include other hardware modules 412. Instructions 408 held by processing unit 406 may be portions of instructions 408 held by the memory/storage 410.

The example software architecture 402 may be conceptualized as layers, each providing various functionality. For example, the software architecture 402 may include layers and components such as an operating system (OS) 414, libraries 416, frameworks 418, applications 420, and a presentation layer 444. Operationally, the applications 420 and/or other components within the layers may invoke API calls 424 to other layers and receive corresponding results 426. The layers illustrated are representative in nature and other software architectures may include additional or different layers. For example, some mobile or special purpose operating systems may not provide the frameworks/middleware 418.

The OS 414 may manage hardware resources and provide common services. The OS 414 may include, for example, a kernel 428, services 430, and drivers 432. The kernel 428 may act as an abstraction layer between the hardware layer 404 and other software layers. For example, the kernel 428 may be responsible for memory management, processor management (for example, scheduling), component management, networking, security settings, and so on. The services 430 may provide other common services for the other software layers. The drivers 432 may be responsible for controlling or interfacing with the underlying hardware layer 404. For instance, the drivers 432 may include display drivers. camera drivers, memory/storage drivers, peripheral device drivers (for example, via Universal Serial Bus (USB)), network and/or wireless communication drivers, audio drivers, and so forth depending on the hardware and/or software configuration.

The libraries 416 may provide a common infrastructure that may be used by the applications 420 and/or other components and/or layers. The libraries 416 typically provide functionality for use by other software modules to perform tasks, rather than rather than interacting directly with the OS 414. The libraries 416 may include system libraries 434 (for example, C standard library) that may provide functions such as memory allocation, string manipulation, file operations. In addition, the libraries 416 may include API libraries 436 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 416 may also include a wide variety of other libraries 438 to provide many functions for applications 420 and other software modules.

The frameworks 418 (also sometimes referred to as middleware) provide a higher-level common infrastructure that may be used by the applications 420 and/or other software modules. For example, the frameworks 418 may provide various graphic user interface (GUI) functions, high-level resource management, or high-level location services. The frameworks 418 may provide a broad spectrum of other APIs for applications 420 and/or other software modules.

The applications 420 include built-in applications 440 and/or third-party applications 442. Examples of built-in applications 440 may include, but are not limited to, a contacts application, a browser application, a location application, a media application, a messaging application, and/or a game application. Third-party applications 442 may include any applications developed by an entity other than the vendor of the particular platform. The applications 420 may use functions available via OS 414, libraries 416, frameworks 418, and presentation layer 444 to create user interfaces to interact with users.

Some software architectures use virtual machines, as illustrated by a virtual machine 448. The virtual machine 448 provides an execution environment where applications/modules can execute as if they were executing on a hardware machine (such as the machine 500 of FIG. 5, for example). The virtual machine 448 may be hosted by a host OS (for example, OS 414) or hypervisor, and may have a virtual machine monitor 446 which manages operation of the virtual machine 448 and interoperation with the host operating system. A software architecture, which may be different from software architecture 402 outside of the virtual machine, executes within the virtual machine 448 such as an OS 450, libraries 452, frameworks 454, applications 456, and/or a presentation layer 458.

Figure 5:
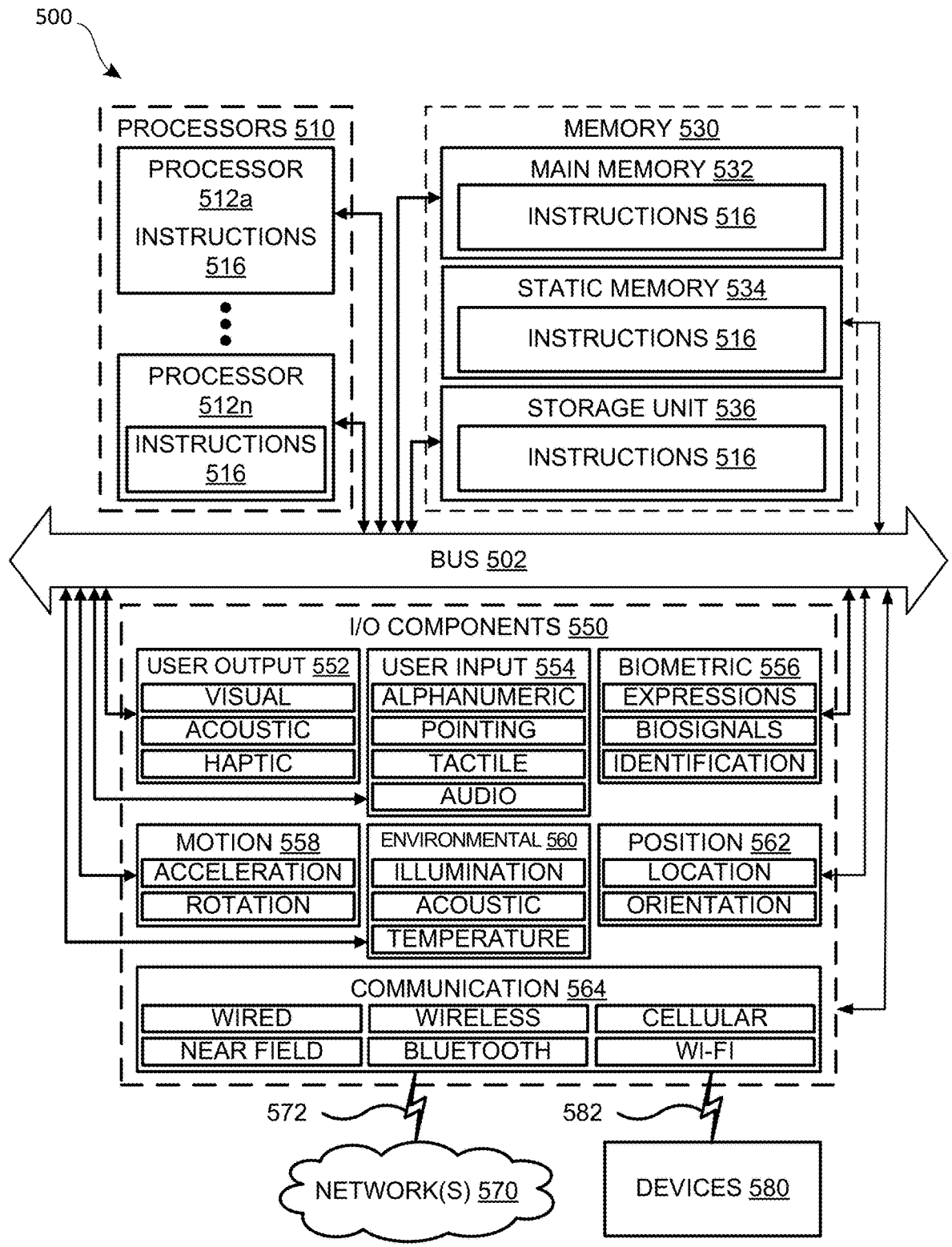
FIG. 5 is a block diagram illustrating components of an example machine configured to read instructions from a machine-readable medium and perform the features described herein.

FIG. 5 is a block diagram illustrating components of an example machine 500 configured to read instructions from a machine-readable medium (for example, a machine-readable storage medium) and perform any of the features described herein. The example machine 500 is in a form of a computer system, within which instructions 516 (for example, in the form of software components) for causing the machine 500 to perform any of the features described herein may be executed. As such, the instructions 516 may be used to implement modules or components described herein. The instructions 516 cause unprogrammed and/or unconfigured machine 500 to operate as a particular machine configured to carry out the described features. The machine 500 may be configured to operate as a standalone device or may be coupled (for example, networked) to other machines. In a networked deployment, the machine 500 may operate in the capacity of a server machine or a client machine in a server-client network environment, or as a node in a peer-to-peer or distributed network environment. Machine 500 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 500 is illustrated, the term "machine" includes a collection of machines that individually or jointly execute the instructions 516.

The machine 500 may include processors 510, memory 530, and I/O components 550, which may be communicatively coupled via, for example, a bus 502. The bus 502 may include multiple buses coupling various elements of machine 500 via various bus technologies and protocols. In an example, the processors 510 (including, for example, a central processing unit (CPU), a graphics processing unit (GPU), a digital signal processor (DSP), an ASIC, or a suitable combination thereof) may include one or more processors 512a to 512n that may execute the instructions 516 and process data. In some examples, one or more processors 510 may execute instructions provided or identified by one or more other processors 510. The term "processor" includes a multi-core processor including cores that may execute instructions contemporaneously. Although FIG. 5 shows multiple processors, the machine 500 may include a single processor with a single core, a single processor with multiple cores (for example, a multi-core processor), multiple processors each with a single core, multiple processors each with multiple cores, or any combination thereof. In some examples, the machine 500 may include multiple processors distributed among multiple machines.

The memory/storage 530 may include a main memory 532, a static memory 534, or other memory, and a storage unit 536, both accessible to the processors 510 such as via the bus 502. The storage unit 536 and memory 532, 534 store instructions 516 embodying any one or more of the functions described herein. The memory/storage 530 may also store temporary, intermediate, and/or long-term data for processors 510. The instructions 516 may also reside, completely or partially, within the memory 532, 534, within the storage unit 536, within at least one of the processors 510 (for example, within a command buffer or cache memory), within memory at least one of I/O components 550, or any suitable combination thereof, during execution thereof. Accordingly, the memory 532, 534, the storage unit 536, memory in processors 510, and memory in I/O components 550 are examples of machine-readable media.

As used herein, "machine-readable medium" refers to a device able to temporarily or permanently store instructions and data that cause machine 500 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 516) for execution by a machine 500 such that the instructions, when executed by one or more processors 510 of the machine 500, cause the machine 500 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 550 may include a wide variety of hardware components adapted to receive input, provide output, produce output, transmit information, exchange information, capture measurements, and so on. The specific I/O components 550 included in a particular machine will depend on the type and/or function of the machine. For example, mobile devices such as mobile phones may include a touch input device, whereas a headless server or IoT device may not include such a touch input device. The particular examples of I/O components illustrated in FIG. 5 are in no way limiting, and other types of components may be included in machine 500. The grouping of I/O components 550 are merely for simplifying this discussion, and the grouping is in no way limiting. In various examples, the I/O components 550 may include user output components 552 and user input components 554. User output components 552 may include, for example, display components for displaying information (for example, a liquid crystal display (LCD) or a projector), acoustic components (for example, speakers), haptic components (for example, a vibratory motor or force-feedback device), and/or other signal generators. User input components 554 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 550 may include biometric components 556, motion components 558, environmental components 560, and/or position components 562, among a wide array of other physical sensor components. The biometric components 556 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 558 may include, for example, acceleration sensors (for example, an accelerometer) and rotation sensors (for example, a gyroscope). The environmental components 560 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 562 may include, for example, location sensors (for example, a Global Position System (GPS) receiver), altitude sensors (for example, an air pressure sensor from which altitude may be derived), and/or orientation sensors (for example, magnetometers).

The I/O components 550 may include communication components 564, implementing a wide variety of technologies operable to couple the machine 500 to network(s) 570 and/or device(s) 580 via respective communicative couplings 572 and 582. The communication components 564 may include one or more network interface components or other suitable devices to interface with the network(s) 570. The communication components 564 may include, for example, components adapted to provide wired communication, wireless communication, cellular communication, Near Field Communication (NFC), Bluetooth communication, Wi-Fi, and/or communication via other modalities. The device(s) 580 may include other machines or various peripheral devices (for example, coupled via USB).

Example implementations according to the disclosure include:

Example 1: A data processing system that includes:
a processor; and
a computer-readable medium storing executable instructions for causing the processor to perform operations comprising:
obtaining raw image data of a sample volume of a sample material, the raw image data comprising light field data of the sample volume acquired using a mesoscope or microscope having a microlens array disposed in front of a camera, the sample material comprising scattering or non-scattering tissue exhibiting time varying changes of light signals from objects of interest; and
analyzing the raw image data using an image analysis pipeline configured to localize the objects of interest in the raw image data to obtain classified image data in which the objects of interest have been identified, the image analysis pipeline being configured to process the raw image data to improve signal extraction at depth in the scattering material to maximize localization accuracy.

Example 2: The volumetric imaging system of claim 1, wherein to obtain the raw image data of a sample volume of a scattering material, the volumetric imaging system of claim 1 is configured to receive the raw image data from an optical path comprising a custom tube lens configured to correct an output of an objective lens to provide at least a multi-millimeter field of view (FOV).

Example 3: The volumetric imaging system of claim 2, wherein the microlens array is placed in an image plane of the custom tube lens.

Example 4: The volumetric imaging system of claim 2, wherein the custom tube lens provides an optical resolution of at least 600 line pairs per millimeter across the entire FOV.

Example 5: The volumetric imaging system of claim 2, wherein the custom tube lens provides telecentric, homogenous illumination across both an image plane and focal plane of the sample material.

Example 6: The volumetric imaging system of claim 2, wherein the custom tube lens comprises three cemented doublet lenses in a configuration based on a Petzval objective design form, the custom tube lens being configured to correct aberrations such that defraction-limited resolution is restored at an NA of 0.4 up to a field radios of at least 1.9 millimeters and reduces field curvature to approximately 60 µm.

Example 7: The volumetric imaging system of claim 1, wherein the microlens array is mounted on a kinematic mount affixed to a housing of the camera, and wherein the microlens array is aligned with the camera by:
  illuminating the microlens array with a collimated green laser been; and
  adjusting kinematic mount until uniform and focus spots are observable behind all microlenses of the microlens array; and
  aligning the microlens array parallel with a pixel grid of the camera.

Example 8: The volumetric imaging system of claim 1, wherein analyzing the raw image data using an image analysis pipeline further comprises:
  analyzing the raw image data to provide non-rigid motion correction on the image data to produce motion-corrected image data.

Example 9: The volumetric imaging system of claim 8, wherein to analyze the image data to provide non-rigid motion correction on the image data to produce motion corrected image data, the executable instructions include instructions for causing the processor to perform operations of:
  rearranging pixels in the raw image data into a plurality of sub-aperture images, wherein each sub-aperture image comprises pixels having a same relative position to a nearest microlens of the microlens array, such that each sub-aperture image corresponds to a perspective view onto the sample from a respective angle; and
  determining non-rigid motion information by analyzing the sub-aperture images.

Example 10: The volumetric imaging system of claim 9, wherein determining the non-rigid motion information for the sub-aperture image further comprises:
  determining the non-rigid motion information by applying an FFT-based registration pipeline to the sub-aperture images.

Example 11: The volumetric imaging system of claim 10, wherein analyzing the raw image data using an image analysis pipeline further comprises:
  removing background fluorescence contributions from the motion-corrected image data to produce background-corrected image data.

Example 12: The volumetric imaging system of claim 11, wherein analyzing the raw image data using an image analysis pipeline further comprises:
  filtering the background-corrected image data using a shape-based filter to remove predetermined shapes from background-corrected image data to generate shape-filtered image data.

Example 13: The volumetric imaging system of claim 12, wherein the shape-based filter comprises a vascular filter configured to identify and filter out blood vessels and other vascular structures from the background-corrected image data.

Example 14: The volumetric imaging system of claim 13, wherein analyzing the raw image data using an image analysis pipeline further comprises:
  filtering the shape-filtered image data to emphasize objects of interest within the shape-filtered image data to generate summary image data.

Example 15: The volumetric imaging system of claim 14, wherein analyzing the raw image data using an image analysis pipeline further comprises:
  performing background-rejecting phase-space reconstruction on the summary image data to remove background light from outside of the sample volume to generate reconstructed image data.

Example 16: The volumetric imaging system of claim 15, wherein to perform background-rejecting phase-space reconstruction on the summary image data, the executable instructions include instructions for causing the processor to perform operations of:
  constructing a 3D volume based on the summary image data;
  estimating a first temporally variable background volume above a target volume;
  estimating a second temporally variable background volume below the target volume; and
  subtracting the first temporally variable background volume and the second temporally variable background volume from the 3D volume.

Example 17: The volumetric imaging system of claim 16, wherein analyzing the raw image data using an image analysis pipeline further comprises:
  performing a morphological segmentation on the reconstructed image data to segment objects of interest from regions surrounding the objects of interest to generate morphologically segmented image data.

Example 18: The volumetric imaging system of claim 17, wherein to perform the morphological segmentation on the reconstructed image data to segment objects of interest from regions surrounding the objects of interest to generate morphologically segmented image data, the executable instructions include instructions for causing the processor to perform operations of:
  segmenting the 3D volume into a plurality of 2D planes;
  convolving each respective 2D plane of the plurality of 2D planes with a first kernel associated with an expected shape of an object of interest and a second kernel associated with an expected shape of a region surrounding the objects of interest to identify locations of the objects of interest within the 3D volume.

Example 19: The volumetric imaging system of claim 11, wherein analyzing the raw image data using an image analysis pipeline further comprises:
  performing iterative spatiotemporal demixing on the morphologically segmented image data to demix signals associated with the objects of interest with signals associated with the regions surrounding the objects of interest and generate spatiotemporally demixed data.

Example 20: The volumetric imaging system of claim 19, wherein to perform performing the iterative spatiotemporal demixing on the morphologically segmented image data to demix signals associated with the objects of interest with signals associated with the regions surrounding the objects of interest and generate the spatiotemporally demixed data, the executable instructions include instructions for causing the processor to perform operations of:
  determining appearances of a set of first footprints of the objects of interest as the footprints would appear to a first camera sensor;
  determining appearances of a set of second footprints of the regions surrounding the objects of interest;
  using non-negative matrix factorization with sparsity regularization to demix the first and second footprints; and generating a candidate mask that represents an anticipated appearance of each respective object of interest and a respective region surrounding the object of interest.

Example 21: The volumetric imaging system of claim 19, wherein analyzing the raw image data using an image analysis pipeline further comprises:

performing a local demixing on the spatiotemporally demixed data to generate locally demixed data in which signals associated with the regions surrounding the objects of interest have been removed by solving an optimization problem that seeks to reduce crosstalk between each respective object of interest and the corresponding respective region surrounding the object of interest; and analyzing the locally demixed data using a machine learning model trained to classify activity traces to provide classified image data.

Example 22: A method implemented in a system for volumetric imaging, the method comprising:

obtaining raw image data of a sample volume of a sample material, the raw image data comprising light field data of the sample volume acquired using a microlens array disposed in front of a camera; and analyzing the raw image data using an image analysis pipeline configured to localize the objects of interest in the raw image data to obtain classified image data in which the objects of interest have been identified, the image analysis pipeline being configured to process the raw image data to improve signal extraction at depth in the scattering material to maximize localization accuracy.

Example 23: A machine-readable medium on which are stored instructions that, when executed, cause a processor of a programmable device to perform operations of:

obtaining raw image data of a sample volume of a sample material, the raw image data comprising light field data of the sample volume acquired using a microlens array disposed in front of a camera; and analyzing the raw image data using an image analysis pipeline configured to localize the objects of interest in the raw image data to obtain classified image data in which the objects of interest have been identified, the image analysis pipeline being configured to process the raw image data to improve signal extraction at depth in the scattering material to maximize localization accuracy.

In some examples, the communication components 564 may detect identifiers or include components adapted to detect identifiers. For example, the communication components 564 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 562, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A volumetric imaging system comprising:
a processor; and
a computer-readable medium storing executable instructions for causing the processor to perform operations comprising:
   obtaining raw image data of a sample volume of a sample material, the raw image data comprising light field data of the sample volume acquired using a mesoscope or microscope having a microlens array disposed in front of a camera, the sample material comprising scattering or non-scattering tissue exhibiting time varying changes of light signals from objects of interest; and
   analyzing the raw image data using an image analysis pipeline configured to localize the objects of interest in the raw image data to obtain classified image data in which the objects of interest have been identified, the image analysis pipeline being configured to process the raw image data to improve signal extraction at depth in scattering material to maximize localization accuracy.

2. The volumetric imaging system of claim 1, wherein to obtain the raw image data of a sample volume of a scattering material, the volumetric imaging system is configured to receive the raw image data from an optical path comprising a custom tube lens configured to correct an output of an objective lens to provide at least a multi-millimeter field of view (FOV).

3. The volumetric imaging system of claim 2, wherein the microlens array is placed in an image plane of the custom tube lens.

4. The volumetric imaging system of claim 2, wherein the custom tube lens provides an optical resolution of at least 600 line pairs per millimeter across the entire FOV.

5. The volumetric imaging system of claim 2, wherein the custom tube lens provides telecentric, homogenous illumination across both an image plane and focal plane of the sample material.

6. The volumetric imaging system of claim 2, wherein the custom tube lens comprises three cemented doublet lenses in a configuration based on a Petzval objective design form, the custom tube lens being configured to correct aberrations such that diffraction-limited resolution is restored at an NA of 0.4 up to a field radios of at least 1.9 millimeters and reduces field curvature to approximately 60 µm.

7. The volumetric imaging system of claim 1, wherein the microlens array is mounted on a kinematic mount affixed to a housing of the camera, and wherein the microlens array is aligned with the camera by:
   illuminating the microlens array with a collimated green laser been;
   adjusting kinematic mount until uniform and focus spots are observable behind all microlenses of the microlens array; and
   aligning the microlens array parallel with a pixel grid of the camera.

8. The volumetric imaging system of claim 1, wherein analyzing the raw image data using an image analysis pipeline further comprises:
   analyzing the raw image data to provide non-rigid motion correction on the raw image data to produce motion-corrected image data.

9. The volumetric imaging system of claim 8, wherein to analyze the raw image data to provide non-rigid motion correction on the raw image data to produce motion corrected image data, the executable instructions include instructions for causing the processor to perform operations of:
   rearranging pixels in the raw image data into a plurality of sub-aperture images, wherein each sub-aperture image comprises pixels having a same relative position to a nearest microlens of the microlens array, such that each sub-aperture image corresponds to a perspective view onto the sample material from a respective angle; and
   determining non-rigid motion information by analyzing the plurality of sub-aperture images.

10. The volumetric imaging system of claim 9, wherein determining the non-rigid motion information for the plurality of sub-aperture images further comprises:
   determining the non-rigid motion information by applying an FFT-based registration pipeline to the plurality of sub-aperture images.

11. The volumetric imaging system of claim 10, wherein analyzing the raw image data using an image analysis pipeline further comprises:
   removing background fluorescence contributions from the motion-corrected image data to produce background-corrected image data.

12. The volumetric imaging system of claim 11, wherein analyzing the raw image data using an image analysis pipeline further comprises:
   filtering the background-corrected image data using a shape-based filter to remove predetermined shapes from background-corrected image data to generate shape-filtered image data.

13. The volumetric imaging system of claim 12, wherein analyzing the raw image data using an image analysis pipeline further comprises:
   filtering the shape-filtered image data to emphasize objects of interest within the shape-filtered image data to generate summary image data.

14. The volumetric imaging system of claim 13, wherein analyzing the raw image data using an image analysis pipeline further comprises:
   performing background-rejecting phase-space reconstruction on the summary image data to remove background light from outside of the sample volume to generate reconstructed image data.

15. The volumetric imaging system of claim 14, wherein analyzing the raw image data using an image analysis pipeline further comprises:
   performing a morphological segmentation on the reconstructed image data to segment objects of interest from regions surrounding the objects of interest to generate morphologically segmented image data.

16. The volumetric imaging system of claim 15, wherein the sample volume is a three-dimensional (3D) volume, wherein to perform the morphological segmentation on the reconstructed image data to segment objects of interest from regions surrounding the objects of interest to generate morphologically segmented image data, the executable instructions include instructions for causing the processor to perform operations of:

segmenting the 3D volume into a plurality of 2D planes; and convolving each respective 2D plane of the plurality of 2D planes with a first kernel associated with an expected shape of an object of interest and a second kernel associated with an expected shape of a region surrounding the objects of interest to identify locations of the objects of interest within the 3D volume.

17. The volumetric imaging system of claim 15, wherein analyzing the raw image data using an image analysis pipeline further comprises:

performing iterative spatiotemporal demixing on the morphologically segmented image data to demix signals associated with the objects of interest with signals associated with the regions surrounding the objects of interest and generate spatiotemporally demixed data.

18. The volumetric imaging system of claim 17, wherein analyzing the raw image data using an image analysis pipeline further comprises:

performing a local demixing on the spatiotemporally demixed data to generate locally demixed data in which signals associated with the regions surrounding the objects of interest have been removed by solving an optimization problem that seeks to reduce crosstalk between each respective object of interest and a corresponding respective region surrounding each object of interest; and analyzing the locally demixed data using a machine learning model trained to classify activity traces to provide classified image data.

19. A method implemented in a system for volumetric imaging, the method comprising:

obtaining raw image data of a sample volume of a sample material, the raw image data comprising light field data of the sample volume acquired using a microlens array disposed in front of a camera; and analyzing the raw image data using an image analysis pipeline configured to localize objects of interest in the raw image data to obtain classified image data in which the objects of interest have been identified, the image analysis pipeline being configured to process the raw image data to improve signal extraction at depth in scattering material of the sample material to maximize localization accuracy.

20. A non-transitory machine-readable medium on which are stored instructions that, when executed, cause a processor of a programmable device to perform operations of:

obtaining raw image data of a sample volume of a sample material, the raw image data comprising light field data of the sample volume acquired using a microlens array disposed in front of a camera; and analyzing the raw image data using an image analysis pipeline configured to localize objects of interest in the raw image data to obtain classified image data in which the objects of interest have been identified, the image analysis pipeline being configured to process the raw image data to improve signal extraction at depth in scattering material of the sample material to maximize localization accuracy.

* * * * *